US009591175B2

(12) United States Patent
Beatty

(10) Patent No.: US 9,591,175 B2
(45) Date of Patent: Mar. 7, 2017

(54) CONNECTING A PRINTER AND A MOBILE DEVICE USING IDENTIFICATION INFORMATION PRINTED BY THE PRINTER

(71) Applicant: Clover Network, Inc., Sunnyvale, CA (US)

(72) Inventor: John Daniel Beatty, Emerald Hills, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 14/927,101

(22) Filed: Oct. 29, 2015

(65) Prior Publication Data

US 2016/0127600 A1 May 5, 2016

Related U.S. Application Data

(60) Provisional application No. 62/074,062, filed on Nov. 2, 2014.

(51) Int. Cl.
*H04N 1/327* (2006.01)
*H04N 1/44* (2006.01)
*H04W 4/00* (2009.01)
*G06F 3/12* (2006.01)
*G06Q 20/20* (2012.01)
*H04N 1/00* (2006.01)

(52) U.S. Cl.
CPC .......... *H04N 1/327* (2013.01); *G06Q 20/209* (2013.01); *H04N 1/00244* (2013.01); *H04N 1/4413* (2013.01); *H04W 4/008* (2013.01)

(58) Field of Classification Search
CPC .... G06F 3/1236; H04N 1/327; H04N 1/4413; H04W 4/008
USPC ................................. 358/1.15, 1.14
See application file for complete search history.

(56) References Cited

U.S. PATENT DOCUMENTS

| 2002/0129247 A1* | 9/2002 | Jablon | H04L 9/0844 713/169 |
| 2004/0246517 A1* | 12/2004 | Parry | H04L 12/58 358/1.15 |
| 2005/0261969 A1* | 11/2005 | Dimmock | G06Q 20/20 705/16 |
| 2007/0201081 A1* | 8/2007 | Murayama | H04L 67/36 358/1.15 |

(Continued)

*Primary Examiner* — Eric A Rust
(74) *Attorney, Agent, or Firm* — The Mueller Law Office, P.C.

(57) ABSTRACT

A computer-implemented method for pairing a point of sale printer with a client device, using two-way identification, is disclosed. The method comprises receiving, using the point of sale printer and a wireless communication protocol, a request to pair the point of sale printer. The method also comprises deriving, using the point of sale printer, the client device, and a device pairing protocol, a shared secret at the client device and the point of sale printer. The method also comprises printing, using the point of sale printer and upon deriving the shared secret, client device association information on a printout. The method also comprises receiving, using the client device and the printout, the client device association information. The method also comprises associating the point of sale printer and the client device using the client device association information as received using the client device.

23 Claims, 16 Drawing Sheets

(56) References Cited

U.S. PATENT DOCUMENTS

2012/0250059 A1* 10/2012 Itogawa ................ G06F 3/1204
  358/1.13
2013/0222841 A1* 8/2013 Masuyama ............ G06K 15/02
  358/1.14
2014/0092421 A1* 4/2014 Shibata .............. H04N 1/00233
  358/1.14

* cited by examiner

CONNECTING A PRINTER AND A MOBILE DEVICE USING IDENTIFICATION INFORMATION PRINTED BY THE PRINTER

CROSS REFERENCE TO RELATED APPLICATION

This application claims the benefit of U.S. Provisional Application No. 62/074,062, filed on Nov. 2, 2014, which is incorporated by reference in its entirety herein for all purposes.

BACKGROUND OF THE INVENTION

Point-of-sale (POS) systems allow users, such as merchants to offer customers flexibility in completing goods or services sales transactions. However, such systems do not allow for enhanced usability functions. The lack of options to interface with other electronic devices may lead to poor user experience and/or inefficient transactions.

SUMMARY OF INVENTION

In one embodiment, a computer-implemented method for pairing a point of sale printer with a client device, using two-way identification is provided. The method comprises receiving, using the point of sale printer and a wireless communication protocol, a request to pair the point of sale printer. The method also comprises deriving, using the point of sale printer, the client device, and a device pairing protocol, a shared secret at the client device and the point of sale printer. The method also comprises printing, using the point of sale printer and upon deriving the shared secret, client device association information on a printout. The method also comprises receiving, using the client device and the printout, the client device association information. The method also comprises associating the point of sale printer and the client device using the client device association information as received using the client device.

In another embodiment, a computer-implemented method for pairing a point of sale printer with a client device, using two-way identification, is provided. The method comprises receiving, using the point of sale printer and a wireless communication protocol, a request to pair the point of sale printer. The method also comprises deriving, using the point of sale printer, the client device, and a device pairing protocol, a shared secret at the client device and the point of sale printer. The method also comprises printing, using the point of sale printer and upon deriving the shared secret, client device association information on a printout. The method also comprises receiving, using the client device and the printout, the client device association information. The method also comprises associating the point of sale printer and the client device using the client device association information as received using the client device.

In another embodiment, a system for pairing a printing device with a client device, using two-way identification is provided. The system comprises a communications module, instantiated on the client device. The communications module is configured to send a request to pair the printing device using a wireless communication protocol and subsequently derive a shared secret with the printing device. The system also comprises a printer. The printing device is configured to instruct the printer to print client device association information upon the communications module deriving the shared secret. The system also comprises a first printout. The first printout is printed by the printer and includes the client device association information that is printed upon the communications module deriving the shared secret. The system also comprises an input device, provided on the client device, to receive the client device association information. The communications module is also configured to associate the printing device with the client device using the client device association information received via the input device.

BRIEF DESCRIPTION OF THE DRAWINGS

FIGS. 6-11 illustrate example user interfaces of a client device while implementing the example method of FIG. 5.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Described herein are systems and methods for providing a POS (point-of-sale) platform. Broadly, the systems and methods described herein may enable a POS platform to interact with local services and third-party applications during POS transactions (e.g., financial transactions, advertisement transactions, coupon transactions, etc.) at physical and remote retail locations. Thus, one or more user devices may be accessed by one or more users (e.g., merchants, employees, customers, etc.). For example, an employee may access a POS platform to complete a transaction with a customer who may have placed an order for products or services (e.g., purchasing batteries, etc.). The POS platform may allow multiple employees to access their accounts on the POS platform to perform certain functions associated with those employees. Some of these functions may be logging time, completing a sales transaction, printing of receipts, or any other function related to a POS platform.

POS Platform Architecture

Figure 1:
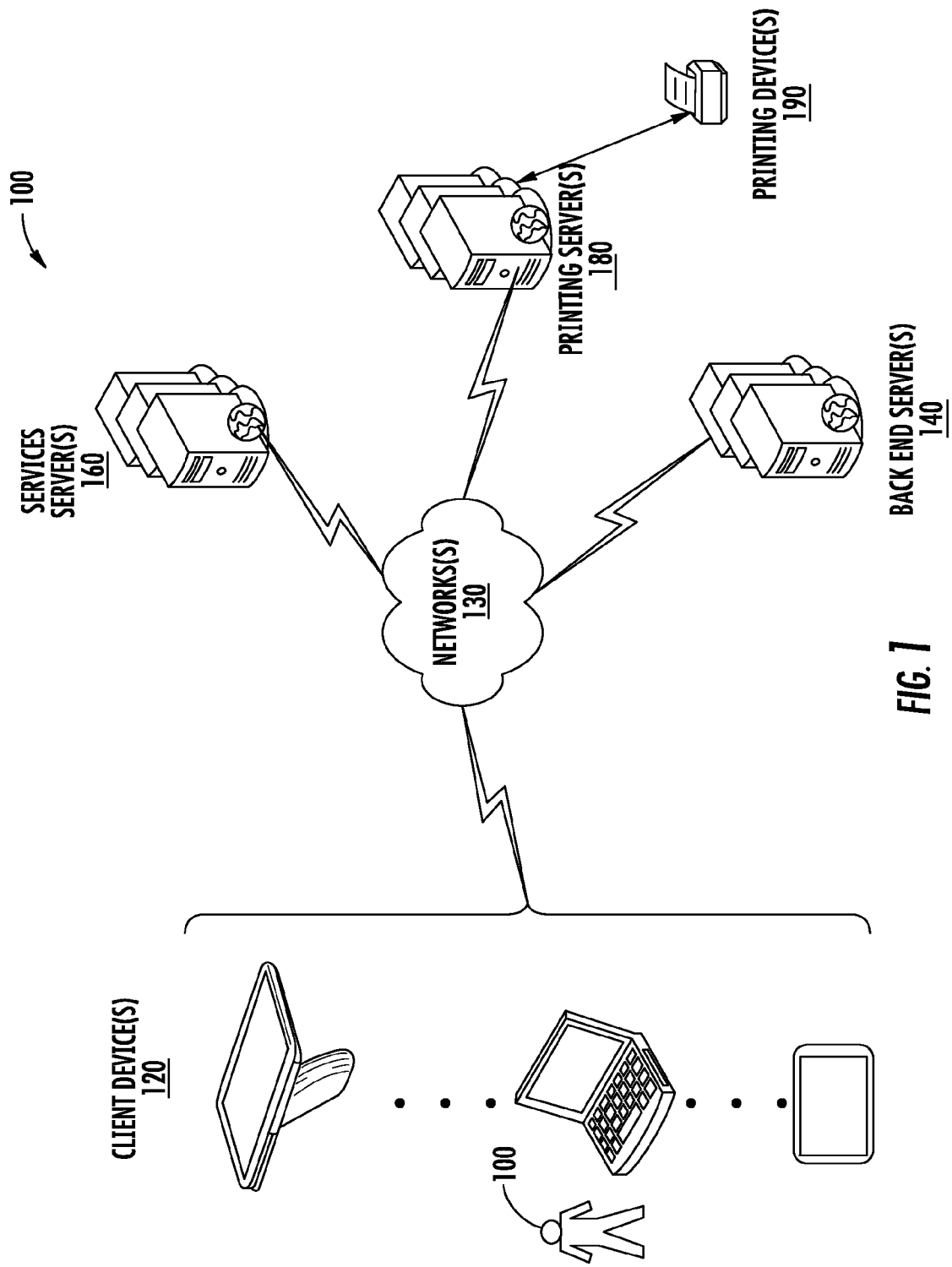
FIG. 1 illustrates an example network architecture for a point-of-sale (POS) platform in accordance with one or more example embodiments.

Referring now to FIG. 1, there is shown an example network architecture for a POS platform system 100 according to certain embodiments of the disclosure. The POS platform system 100 may include one or more client devices 120. The one or more client devices 120 may be any of suitable devices that may be configured to execute one or more applications, software, and/or instructions to provide one or more services to the user 110. User 110 may be any person accessing a client device (e.g., client device 120), such as, merchants, employees, customers, system administrators, etc. Each client device 120 may be a POS stationary device (e.g., attached to a physical location), a mobile POS (e.g., able to be used in remote locations), a mobile device, a laptop computer, a desktop computer, other device with computer functionalities, or any combination thereof and/or other types of devices associated with a merchant at various locations. Each client device 120 may have a built-in stand that may support the client device 120. Further, each client device 120 may include a handle that a user (e.g., user 110) may hold and/or otherwise support the device with, for instance, the user's hand or arm. For example, the client device(s) 120 may be purpose-built POS equipment, a self-service kiosk, a smart phone, a tablet, a wearable computer device, or an e-reader operating a mobile operating system.

The POS platform system 100 may also include one or more back-end servers 140. Each back-end server 140 may be one or more independent computer systems, such as instances of the computer system 300 of FIG. 3, for performing back-end processes for sales transactions. Each back-end server 140 may be coupled to one or more remote services servers 160 via a back-end API (application program interface). The back-end API may be an application programming interface for one or more back-end servers 140 to supplement the services provided by the one or more remote services servers 160. The one or more back-end servers 140 may communicate with the one or more remote services servers 160 via one or more networks 130 as well.

The one or more client devices 120 may be coupled to the one or more remote services servers 160 via a client API, which may be used to access the services and functionalities provided by the one or more services servers 160. Each client device 120 may communicate with the one or more services servers 160 via one or more networks 130. Each services server 160 may be implemented by a computer system, such as the computer system 300 of FIG. 3. In some embodiments, each services server 160 may be a cloud-based computer system, where no on-premise servers are required, which can reduce relative cost and complexity of hardware, installation and ongoing maintenance and administration.

The POS platform system 100 may include a printing server 180. The printing server 180 may communicate with one or more POS printing devices 190. As shown in respective FIGS. 1 and 2, the client device 120 may be connected directly to a printing server 180 or may be connected to the printing server 180 through one or more networks 130. Further, in some instances, the client device 120 may connect directly to one or more POS printing devices 190.

The one or more networks 130 may be a system for communication. The network channel may encompass a variety of mediums of communication, such as wired communication for one part and wireless communication for another part. The network channel may be part of the Internet. Each network 130 may include an Ethernet or other wire-based network or a wireless NIC (WNIC) or wireless adapter for communicating with a wireless network, such as a WI-FI network. Each network 130 may include any suitable network for any suitable communication interface. As an example and not by way of limitation, the network channel may include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel may be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

Each network 130 may include links using technologies such as Ethernet, 802.11, worldwide interoperability for microwave access (WiMAX), 3G, 4G, CDMA, digital subscriber line (DSL), etc. Similarly, the networking protocols used on the network channel may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network channel may be represented using technologies and/or formats including the hypertext markup language (HTML) and the extensible markup language (XML). In addition, all or some of links may be encrypted using conventional encryption technologies such as secure sockets layer (SSL), transport layer security (TLS), and Internet Protocol security (IPsec).

Figure 2:
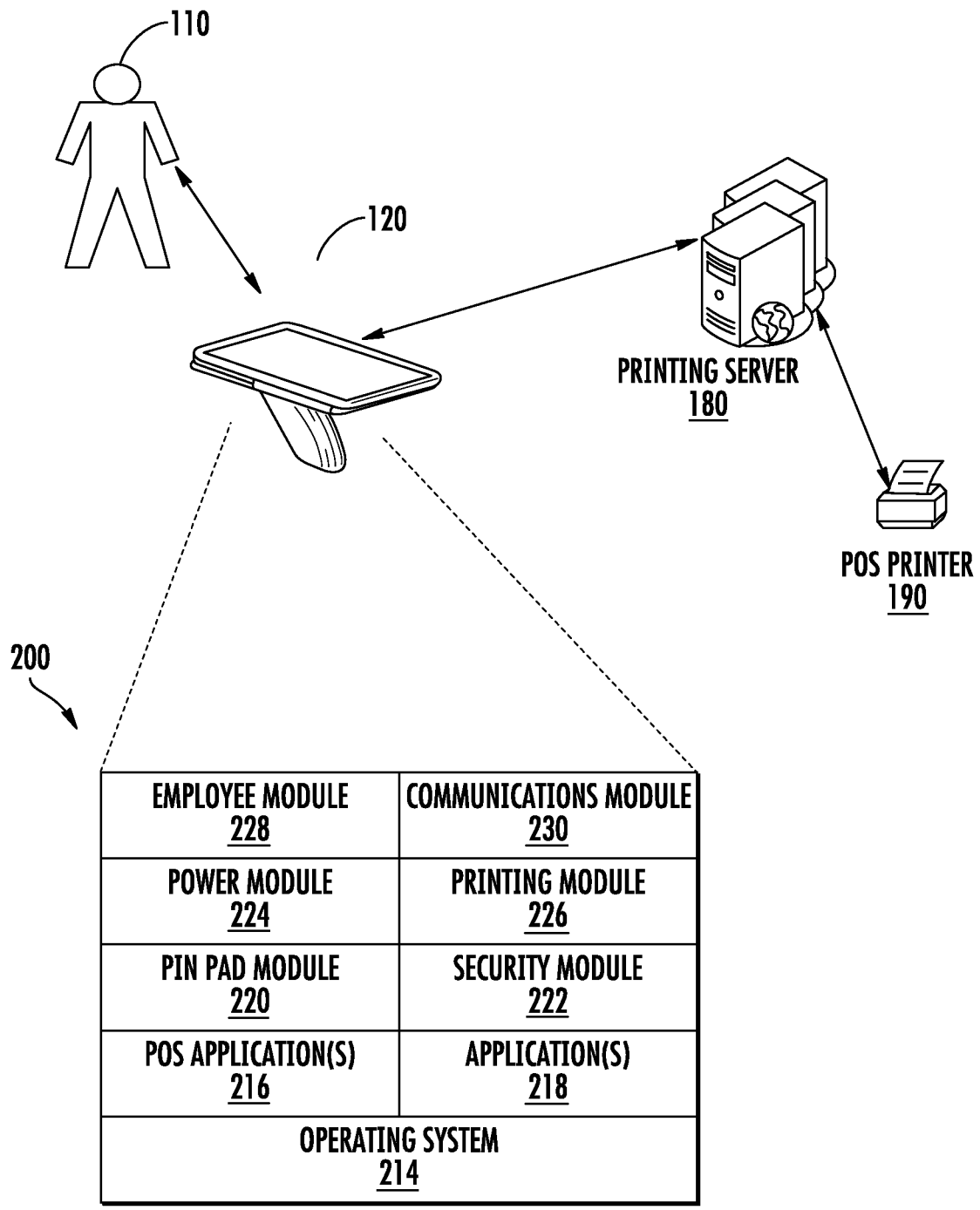
FIG. 2 illustrates another example architecture of a point-of-sale device for a point-of-sale (POS) platform in accordance with one or more example embodiments.

With reference to FIG. 2, there is shown a diagrammatic representation of an example architecture 200 of a client device 120 for a POS platform 100 in accordance with one or more embodiments of the disclosure. FIG. 2 illustrates one or more users (e.g., user 110) with one or more client devices (e.g., client device 120) interacting with one or more printing servers (e.g., printing server 180) and one or more printers (POS printer 190). As mentioned above, client device 120 can also communicate directly with POS printer 190.

The client device 120 may include a client operating system 214, at least one point-of-sale application (e.g., POS application 216), and one or more applications (e.g., application(s) 218). Additionally, client device 120 may be configured to provide a number of services via internal modules. For example, client device 120 may include a PIN (personal identification number) pad module 220, a security module 222, a power module 224, a printing module 226, an employee module 228, and a communications module 230. The communications module 230 may be a Bluetooth module.

Each of the modules can operate individually and independently of other modules. Some or all of the modules can be combined as one module. A single module can also be divided into sub-modules, each performing separate method operations or method operations of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The client device 120 can include additional, fewer, or different modules for various applications. Conventional components such as network interfaces, security functions, load balancers, failover servers, management and network operations consoles, and the like are not shown so as to not obscure the details of the system.

The operating system 214 may an operating system of the client device 120, such as Android™ or iOS™ or any other operating system that may be suitable for a point-of-sale system. The operating system 214 may be an open or closed format. An open format may be an operating system that may allow users to modify and interact with its source code (e.g., Windows™, and Android™). A closed format operating system may be a stand-alone operating system that defines parameters for interacting with such operating systems without allowing users to make modifications. For example, a closed operating system may not allow root access to the file system (e.g., iOS™).

The POS application 216 may contain modules executable on the client device 120 to perform point-of-sale services (e.g., Clover™ services, or any other POS services). The POS application 216 may include a timecards module, a self-serve module, a register module, a store inventory module, or any combination thereof. The one or more applications, such as 218, may include applications that may be built-in or may be provided by third-party applications. For example, one or more applications 218 may include a register module, which may be configured to provide an interface for a merchant to facilitate sales transactions in a business. The register module may have bar code scanner functionality, check-out functionality, payment functionality, or any combination thereof. It is understood that the register module is one of many possible modules that may exist within one or more applications 218 executing on respective client devices 120, and that other modules may be implemented.

The PIN pad module 220 may be configured to allow a user (e.g., user 110) to interact with a particular client device, such as 120. The PIN pad module 220 may allow customers to enter information associated with a transaction, such as a sales transaction. The PIN pad module 220 may be configured to operate with either a touch screen or a physical PIN pad system associated with the client device 120. The PIN pad module 220 may be configured to operate in a secure or insecure mode. A secure mode may be a mode that may require heightened security when entering information (e.g., payment authentication information).

The PIN pad module 220 may be configured to operate with the operating system 214 in a secure mode even if the operating system 214 is an open format (e.g., Windows™, and Android™). The information may be related to a debit card or a credit card, or any other form of information related to a point-of-sale system. For example, a customer (e.g., user 110) may be purchasing a product from a business using a debit card. The customer may enter a code associated with the debit card in order to facilitate or otherwise complete the transaction.

The security module 222 may be configured to interact with the PIN pad module 220 to enable secure transactions (e.g., payments, entering personal information, etc.) to operate in a secure mode and to follow industry standard for secure transactions. Payment Card Industry (PCI) as a governing body for payment security may provide for guidelines to follow when implementing a secure sales transaction. For example, operating a physical PIN pad may allow for better control for implementing a secure sales transaction. However, operating a touch screen PIN pad may present challenges when operating with an open format operating system (e.g., Android™). In one embodiment, the PIN pad module 220 may operate a touch screen PIN pad that allows a user to enter the PIN of their debit card. The security module 222 may be configured to operate with one or more central processing units (CPUs) to implement secure sales transactions. For example, a client device, such as 120, may be configured to operate using a CPU that may be dedicated for secure transactions and an insecure CPU dedicated for insecure transactions. Secure transactions may be, for example, swiping a credit card, entering a PIN for a debit card, or any other transactions related to executing a secure transaction. Insecure transactions may be any transaction that may be related to using the client device 120 without handling secure data. For example, during a sales transaction, if a customer swipes his or her credit card, the security module 222 may select a secure CPU to complete the transaction. Although the above example is presented with two CPUs, other combinations of secure and insecure processors may be envisioned. For example, a CPU may be divided into two areas, one secure and one insecure or a plurality of CPUs may be separated into secure or insecure processors.

The security module 222 may be implemented independent of the operating system 214. For example, this may allow developers to work independently from the firmware of the operating system 214, which may allow for better code control in situations where the operating system 214 is an open platform (e.g. Android™).

The power module 224 may be configured to power on the client device 120. For example, the power module 224 may allow the client device 120 to power on using a physical button, a touchscreen button or without the use of buttons. For example, client device 120 may contain a touch sensitive handle that may work in conjunction with a wristband to activate a near field communication (NFC)-type device. It is understood that NFC is a set of standards for smartphones and similar devices to establish radio communication with each other by touching them together or bringing them into proximity, usually no more than a few inches.

The communications module 230 may be configured to enable the client device 120 to communicate in accordance with a wireless protocol. For example, the communications module 230 could be a Bluetooth module to allow the client device to utilize Bluetooth technology (e.g., Bluetooth LE or BLE™) to communicate with other devices. The communications module could also be a Zigbee™, iBeacon™, or Eddystone™ module, or a module for any alternative low energy communication protocol. The communications module 230 may enable BLE™ payments or may enable using digital wallets (e.g., Google Wallet™, or any other digital wallets that may be used without the need for physically possessing a payment card). It is understood that BLE™ may provide low power consumption while maintaining communication range. The communications module 230 may enable a user (e.g., user 110) to communicate with a printing server (e.g., printing server 180), or directly with a printing device (e.g., POS printer 190) to print a document, such as a receipt, on a printer (e.g., POS printer 190). It is understood that the above are only examples for using the Bluetooth module 230 to interact with other devices and that other uses may be envisioned.

The communications module 230 or the communications module on POS printer 190 may facilitate discovery for a pairing procedure. For example, either the client device or the POS printer may broadcast low energy packets that identify the device to counterpart devices that may be looking for devices to pair to. As a more particular example, POS printer 190 may broadcast low energy advertisement packets that identify itself as a POS printer of a particular kind meant to be paired with the particular class of client devices represented by client device 120. Also, either device may utilize their communication modules to scan for devices that claim to be the kind of devices they are meant to pair with. For example, client device 120 could scan for devices that claim to be POS printers 190. The devices could identify themselves based on the contents of a general identification field such as the "device name" fields of certain protocols. For example, the general identification field could include a company name, an additional identifier such as "printer", and the last few digits of a manufacturer's serial number for POS printer 190. In this example, the POS printer 190 will come "out of the box" with this information in the general identification field. As another example, the device name could be a registered object identifier prefix in a reserved MAC address range for the communications protocol used by the POS printer 190 and communications module 230. The prefix could be registered with an industry standards body.

The communications module 230 may be configured to enable the client device 120 to be associated with POS printer 190. For example, the communication module could include executable instructions in accordance with a pairing protocol. In specific approaches, POS printer 190 will also have a communications module to enable pairing of client device 120 and POS printer 190. In these instances, the communications module 230 may work in combination with a communications module on POS printer 190 to derive a shared secret to serve as part of the pairing procedure conducted between the two devices. In accordance with certain pairing procedures, the shared secret is generated in such a way that it cannot be intercepted by an external device that is spoofing client device 120 and POS printer 190 into thinking they are communicating directly with each other. As a result, the dynamically generated shared secret, or a hash thereof, can be obtained from the POS printer 190 or the client device 120 to confirm that the link established by the pairing procedure is secure. The dynamically generated shared secret, or a hash thereof, can be the client device association information that is referred to below in this disclosure.

Client device association information can be used to provide two-way identification to the pairing procedure. The information can be obtained from either device and passed to the other device for confirmation using an alternative communications channel (i.e., a channel that is separate from the one that is being set up via the pairing procedure). For example, the printer could print the client device association information for visual inspection by user 110, and the user could manually enter that information into client device 120 via a user interface on client device 120. Other channels could include outputting the information on a display on POS printer 190, outputting the information in the form of a printed scannable code from POS printer 190 for scanning by a scanner of device 120, or an alternative wireless link between POS printer 190 and client device 120 provided via modulated visible light, IR communication, NFC communication, or others.

The printing module 226 may also be configured to enable a user (e.g., user 110) to send one or more print jobs to one or more printing servers (e.g., printing server 180). For example, a printing server (e.g., printing server 180) may be connected to at least one printing device (e.g., POS printer 190). The printing device (e.g., POS printer 190) may be a stationary (e.g., associated with a physical location) or a mobile printer (e.g., portable printer that may be independent of a physical location). The POS printer 190 may be a mobile printer (e.g., portable printer) that may accompany the client device 120. For example, a client device 120 may be used in a food truck, where the POS printer 190 may also be used to allow portability.

The location of the POS printer 190 may determine whether client device 120 begins a pairing procedure with that printer. For example, if a printer is in close proximity with client device 120, the client device 120 may enable the POS printer 190 to power on to engage in a pairing procedure. For example, using a communication protocol (e.g., BLE™), client device 120 may find a printing server (e.g., printing server 180), and/or printer (e.g., POS printer 190) and may enable the POS printer 190 to power on. The client device 120 may enable the POS printer 190 to power on by generating a wake-up message associated with the printing server 180 and/or POS printer 190. Once POS printer 190 has been powered on, the client device 120 can engage in a pairing procedure with POS printer 190.

The location of the POS printer 190 may determine whether the client device 120 may interact with that printer. For example, if two printers are in close proximity to a client device 120, the client device 120 may choose to communicate with the printer that meets certain criteria (e.g., the closest, the newest, the biggest, etc.). For example, using a communication protocol (e.g., BLE™), the client device 120, may find the closest printing server (e.g., printing server 180), and/or the closest printer (e.g., POS printer 190) and may enable the POS printer 190 to power on.

The client device 120 may enable the POS printer 190 to power on by generating a wake-up message associated with the printing server 180 and/or POS printer 190. The printing module 226 may establish a communication session with the printing server (e.g., printing server 180), and/or the closest printer (e.g., POS printer 190). The communication session may allow the client device 120 to print to a printer (e.g., POS printer 190) or to power on a printer (e.g., POS printer 190). The client device 120 may remotely control the power of the POS printer 190 during data transmission. For example, the POS printer 190 may be powered on to complete a print job. After the print job is complete, the POS printer 190 may be powered off. In some embodiments, BLE™ may be used to control hardware interrupts to power on and/or power off the POS printer 190. For example, the POS printer 190 may stay in sleep mode until the client device 120, using BLE™, wakes up the POS printer 190. At that point, a regular Bluetooth connection may be established through which the print job may be sent to be printed.

Cloud Services

In another embodiment, the client device 120 may utilize remote servers, such as, cloud services servers (e.g., services servers 160) to complete a transaction with a customer. Each services server 160 may be implemented by a computer system, such as the computer system 300 of FIG. 3, which may be controlled by operating system software. Each services server 160 may also include any number of POS applications (e.g., Clover® services, or any other application that relate to a POS system). Additionally, each services server 160 may include applications that may be built-in or may be provided by third-party applications. In an illustrative example, a user (e.g., user 110) may initiate a transaction and/or modify a transaction (e.g., creating/modifying a purchase order of a product or a service) on a client device (e.g., client device 120). The POS applications may notify the services server (e.g., services server 160) that a change to a transaction may have occurred. A change to a transaction may be, for example, adding new items to the order, adding taxes, applying coupons, adding special notice of the transaction, or any other changes associated with the transaction.

Computer System

Figure 3:
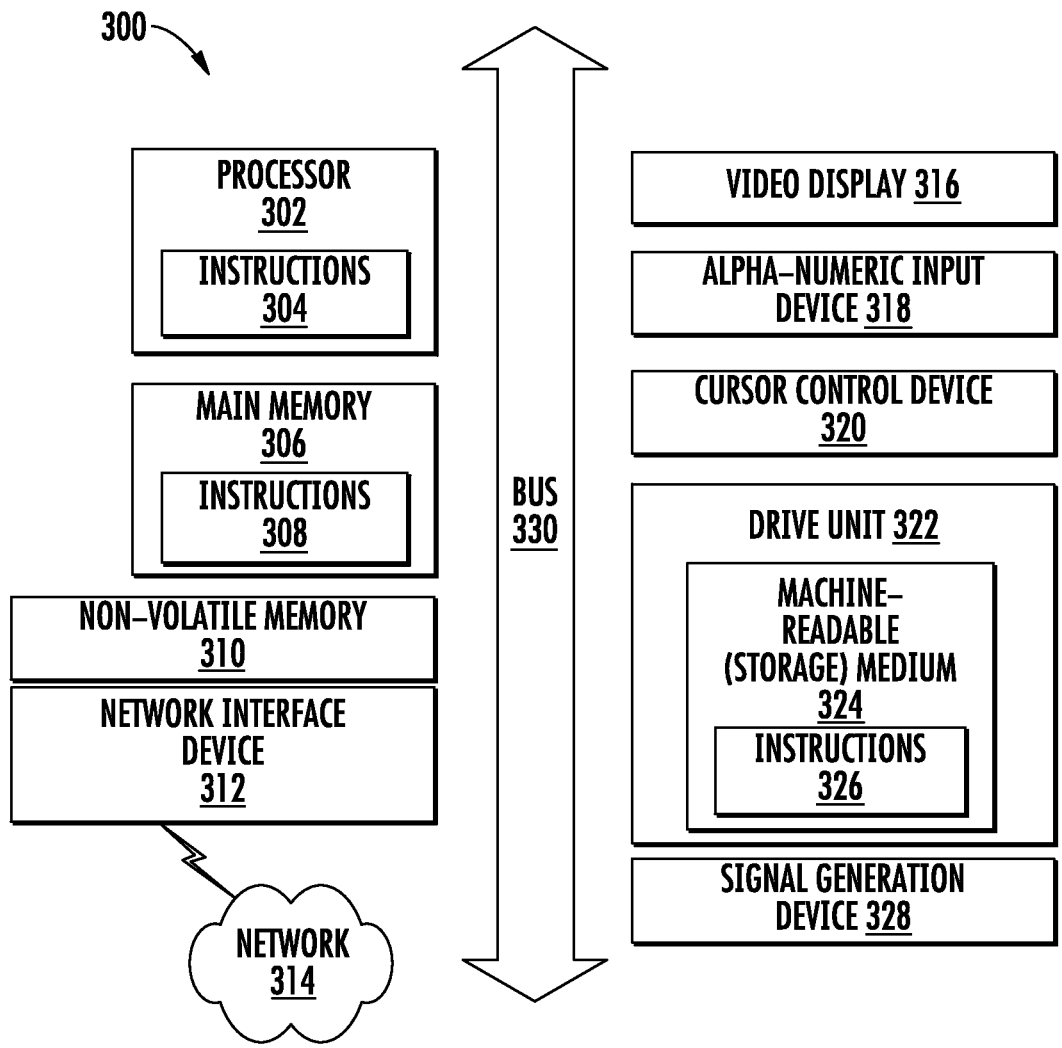
FIG. 3 illustrates a diagram of an example computer system for a point-of-sale (POS) platform in accordance with one or more example embodiments.

Referring now to FIG. 3, therein is shown a diagrammatic representation of a machine in the example form of a computer system 300 within which a set of instructions, for causing the machine to perform any one or more of the methodologies or modules discussed herein, may be executed or instantiated, according to certain embodiments of the disclosure.

In the example of FIG. 3, the computer system 300 may include a processor 302, memory 306, non-volatile memory 310, and an interface device 312. Various common components (e.g., cache memory) are omitted for illustrative simplicity. The computer system 300 is intended to illustrate an example hardware device on which any of the components depicted in the examples of FIGS. 1 and 2 (and any other components described in this specification) may be implemented. The computer system 300 may be of any applicable known or convenient type. The components of the computer system 300 may be coupled together via a bus 330 or through some other known or convenient device.

This disclosure contemplates the computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable computer device, a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

The processor 302 may be, for example, a conventional microprocessor such as an Intel™ Pentium™ microprocessor or Motorola™ Power PC™ microprocessor. One of skill in the relevant art may recognize that the terms "machine-readable (storage) medium" or "computer-readable (storage) medium" include any type of device that is accessible by the processor. The processor may include instructions 304.

The memory 306 may be coupled to the processor 302 by, for example, a bus 330. The memory 306 may include, by way of example but not limitation, random access memory (RAM), such as dynamic RAM (DRAM) and static RAM (SRAM). The memory 306 may be local, remote, or distributed. The memory may include instructions 308.

The bus 330 may also couple the processor 302 to the non-volatile memory 310 and drive unit 322. The non-volatile memory 310 may often be a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data may often be written, by a direct memory access process, into memory during execution of software in the computer 300. The non-volatile storage may be local, remote, or distributed. The non-volatile memory 310 is optional because systems may be created with all applicable data available in memory. A typical computer system may usually include at least a processor 302, memory 306, and a device (e.g., a bus 330) coupling the memory 306 to the processor 302.

Software may typically be stored in the non-volatile memory 310 and/or the drive unit 322. The drive unit 322 may include machine-readable (storage) medium 324. The machine-readable (storage) medium may include instructions 326. Indeed, for large programs, it may not even be possible to store the entire program in the memory 306. Nevertheless, it should be understood that for software to run, if necessary, it is moved to a computer readable location appropriate for processing, and for illustrative purposes, that location is referred to as the memory 306 in this disclosure. Even when software is moved to the memory for execution, the processor 302 may typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor 302 is considered to be "configured to execute a program" when at least one value associated with the program is stored in a register readable by the processor 302.

The bus 330 may also couple the processor 302 to the network interface device 312 to communicate via one or more networks 314. The interface 312 may include one or more of a modem or network interface. It will be appreciated that a modem or network interface may be considered to be part of the computer system 300. The interface may include an analog modem, ISDN modem, cable modem, token ring interface, satellite transmission interface (e.g. "direct PC"), or other interfaces for coupling a computer system to other computer systems. The interface may include one or more input and/or output devices (e.g., video display 316, alphanumeric input device 318, cursor control device 320, etc.). The I/O devices may include, by way of example but not limitation, a keyboard, a mouse or other pointing device, a gesture control and/or detection device, an eye movement control and/or detection device, disk drives, printers, a scanner, and other input and/or output devices, including a video display device 316. The display device 316 may include, by way of example but not limitation, a cathode ray tube (CRT), liquid crystal display (LCD), or some other applicable known or convenient display device. For simplicity, it is assumed that controllers of any devices not depicted in the example of FIG. 3 reside in the interface.

In operation, the computer system 300 may be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system may typically be stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated (e.g., by signal generation device 328). It has proven convenient at times, principally for reasons of common usage, to refer to these signals as bits, values, elements, symbols, characters, terms, numbers, or the like.

Printer Activation and Pairing Procedures

Figure 4:
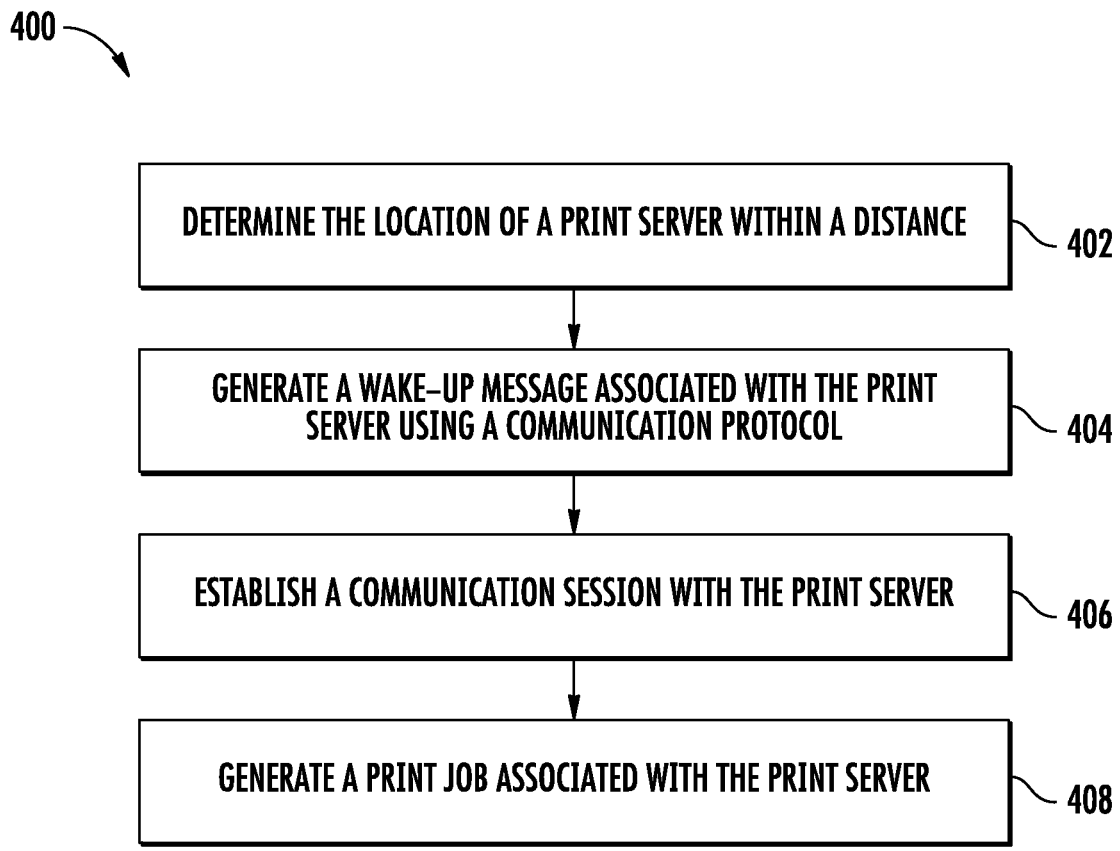
FIG. 4 illustrates a flow diagram of an example method for operating a point-of-sale (POS) platform in accordance with one or more example embodiments.

Turning now to FIG. 4, a flow diagram of a method 400 for activating a POS printer in a POS platform is illustrated according to one or more example embodiments. The method 400 may include block 402, in which a computer, such as a client device 120, remote service server(s) 160, and/or a combination thereof may determine the location of a print server or POS printer within a distance from the client device 120. In block 404, the computer may generate a wake-up message associated with the print server using a communication protocol. For example, the wake-up message could be generated by printing module 226 and the communication protocol could be BLE™. In block 406, the computer may establish a communication session with the print server. The communication session could be a regular Bluetooth connection that is established after the POS printer has received the wake-up message from the client device. In block 408, the computer may generate a print job associated with the print server.

Figure 5:
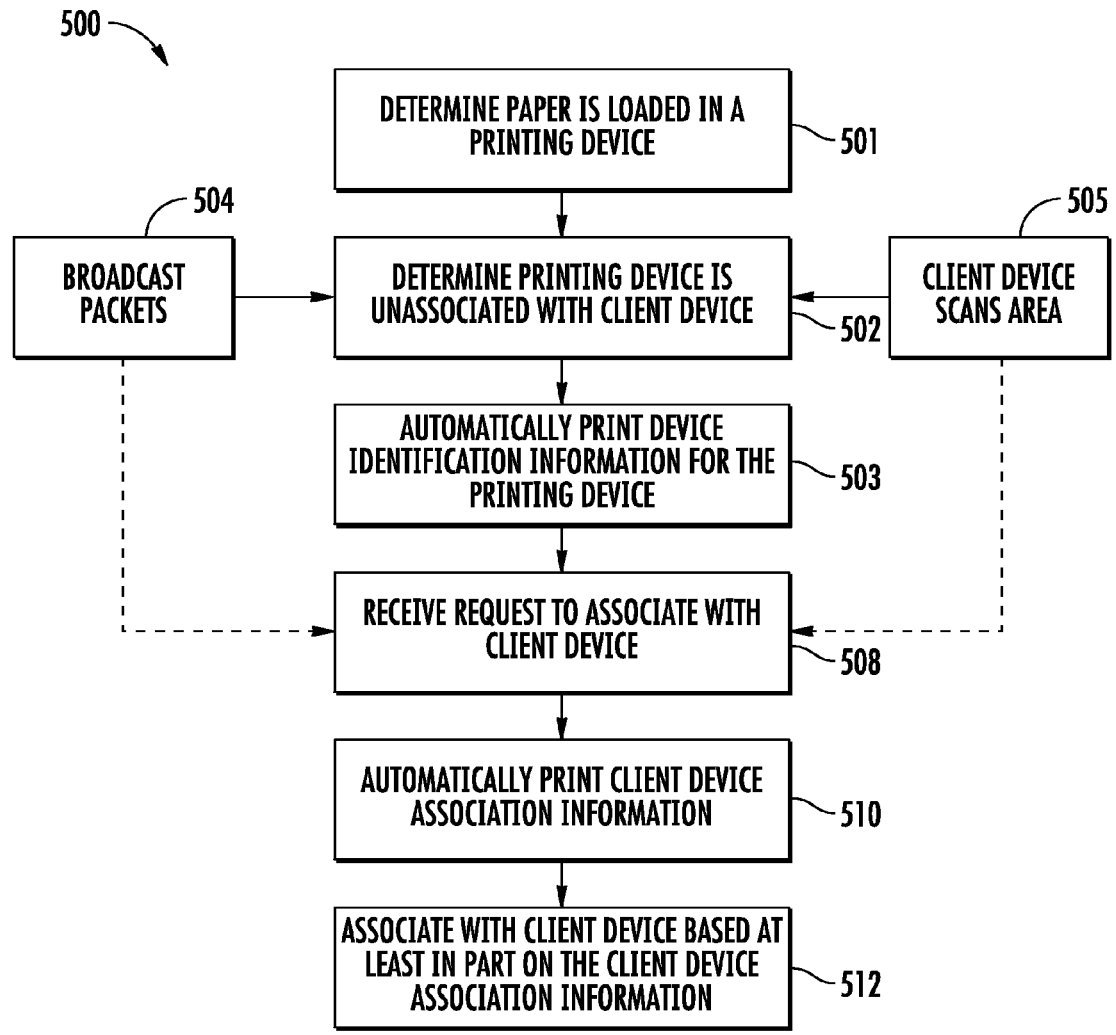
FIG. 5 illustrates a flow diagram of an example method for establishing a connection between a printing device and a client device in accordance with one or more example embodiments.
Figure 6:
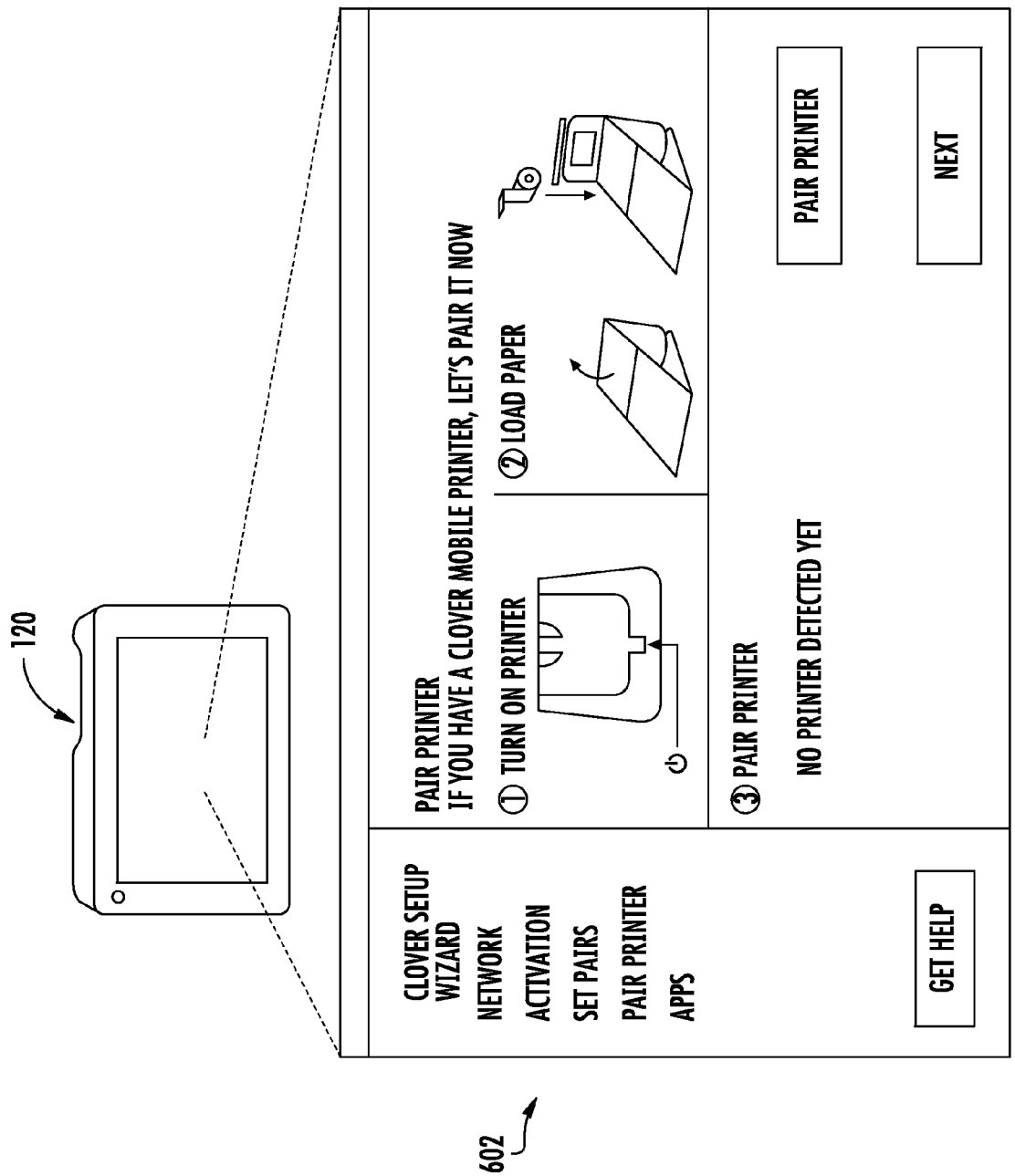

Referring now to FIG. 5, a flow diagram of a method 500 for associating a printing device and a client device, as described herein, is illustrated according to one or more example embodiments. FIGS. 6-11 illustrate example user interfaces at the client device that may be presented during implementation of the method 500 and will be discussed in conjunction with FIG. 5. These user interfaces may be displayed on a touch display of client device 120 and allow the user to administrate a pairing procedure with two-way identification between the client device and a printing device. Certain steps in method 500 are optional as will be apparent from the following disclosure.

Prior to the execution of any of the steps in method 500, a computer, such as client device 120, remote service server(s) 160, and/or a combination thereof may be powered on, while a printing device, such as POS printer 190, is not powered on. Alternatively, client device 120 may be outside a distance from any discoverable printing device. In either situation, the client device may be configured to present a user interface 602 such as that illustrated in FIG. 6, with instructions to begin establishing a connection between the client device and a printing device. For example, the user interface 602 may instruct a user to power on a POS printer 190 and/or load paper into the printer. The user interface may additionally include instructions to move into closer proximity with a POS printer 190.

Next, but still prior to the execution of any of the steps in method 500, the printing device may be powered on. As described herein, the printing device may be powered on in response to client device 120 generating a wake-up message associated with the printing device, or in response to the printing device being manually powered on. As mentioned previously, the wake-up message may be generated by a low power short range communication protocol such as BLE™. In some embodiments, the printing device and/or client device may present status indicators such as light emitting diodes, audible sounds, lights, or other indicators to indicate a power and/or operational status of the printing device to the user. Power status may indicate an on or off state, or a low battery state, for example. Operational status may include active connection, no paper, or low paper, for example. When, or before, the printing device is powered on, paper may be loaded into the printing device.

Turning to FIG. 5, optional steps 501-503 may be conducted to assist in a two-way pairing procedure between the printing device and a client device. At block 501, the printing device may determine that paper is loaded in the printing device. At block 502, the printing device may determine that the printing device is unassociated with at least one client device. For example, the POS printer 190 may determine that it is unassociated with the client device 120. This step can involve the POS printer 190 identifying a particular client device via a short range wireless discovery process or it can involve the POS printer 190 checking an internal data store to determine that it has not recorded an association with any client device. Upon determining that the printing device is unassociated with at least one client device, at block 503 the printing device may automatically print device identification information for the printing device. For example, the POS printer 190 may print all of, or a portion of, the device hardware serial number. The printing device can be configured to execute steps 501-503 once every time the printing device is manually turned on, every time it receives a wake-up message, or every time it engages in a discovery process with an unassociated client device via short range wireless communication. In another embodiment, the POS printer 190 may print a numerical sequence, a scannable barcode, such as a Quick Response Code, or other information associated with the printing device that allows the printing device to be identified.

In some embodiments, the printing device may be positioned nearby the client device, such that short range communication (e.g., BLE™, NFC, etc.) with the printing device is possible. Therefore, optional steps 504 and 505, which involve a discovery process for a short range communications protocol, may also be conducted to assist in the two-way pairing procedure between the printing device and a client device. Steps 504 and 505 could each be individually conducted in combination with steps 501-503. Notably, steps 504 and 505 may be the impetus for step 502 in that they both involve the POS printer and client device engaging in a discovery process via short range wireless communication.

In step 504, the printing device will broadcast low energy packets that identify the device as a printing device. These packets could be broadcast repeatedly with a period of, for example, greater than 10 milliseconds in order to preserve the battery life of a mobile printer while still allowing for rapid discovery to facilitate a seamless pairing procedure. For example, the printing device could broadcast BLE™ packets identifying itself as a POS printer for reception by client devices that are within range. The client devices that are configured to operate with the printing device could be configured to scan for packets of that type and add them to a list of printing devices displayed on a user interface of the client device. The client devices could alternatively or in combination be configured to send wake-up messages to devices broadcasting such packets.

In step 505, the client device will send out scans to find devices that claim to be the kind of devices they are meant to pair with. For example, client device 120 could scan for devices that claim to be POS printers 190. The devices could identify themselves based on the contents of a general identification field such as the "device name" fields of certain protocols. For example, the general identification field could include a company name, an additional identifier such as "printer", and the last few digits of a manufacturer's serial number for POS printer 190. In this example, the POS printer 190 will come "out of the box" with this information in the general identification field. As another example, the device name could be a registered object identifier prefix in a reserved MAC address range for the communications protocol used by the POS printer 190 and communications module 230. The prefix could be registered with an industry standards body.

Figure 7:
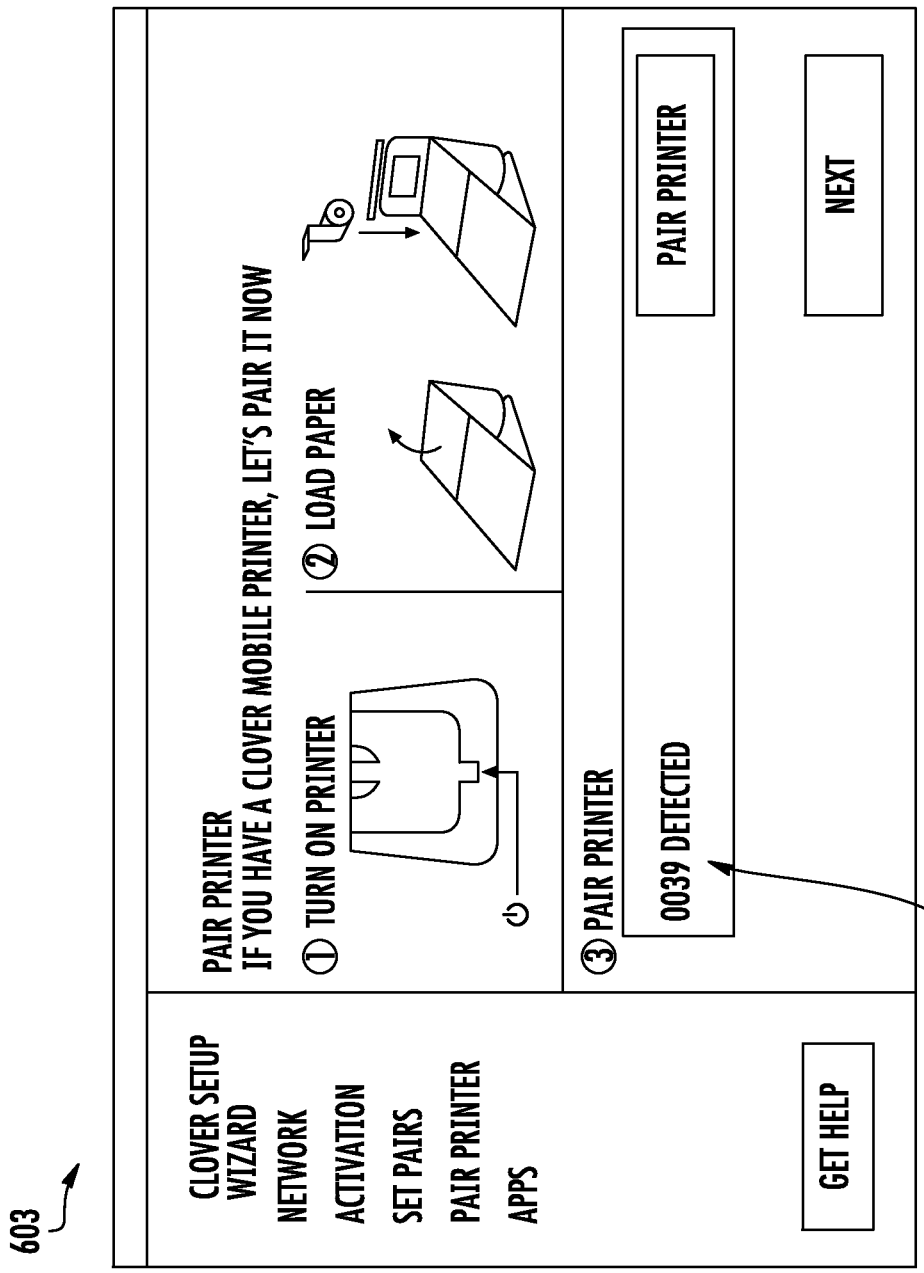

Prior to the execution of step 508, the user interface 602 could be updated to user interface 603 as shown in FIG. 7. The user interface 603 further identifies POS printers that are detected or are otherwise available for pairing or establishing a connection with. Again, steps 504 and 505, as well as the introductory steps of any low energy wireless pairing procedure, can serve as the impetus for steps 502, and the display of printing devices in user interface 603 can in turn be conducted upon determining that the devices are unassociated in step 502. As a result, the user interface can display any number of printing devices that are within the discoverable range of the client device.

In some embodiments where multiple printing devices are present and/or within communication range of the client device, the client device may utilize a two-way identification method of establishing a connection between one or more of the available printing devices so as to avoid unintentional pairings or pairings intended to disrupt or interrupt the connection between a printing device and another client device. As shown in user interface 603, the list of POS printers could include a device identifier 604 that matches the device identifier printed by the POS printer in step 503. This would allow the user to visually inspect the device identifier on the POS printer and cross reference it with user interface 603 to assure that they were pairing with the appropriate device. Since the POS printer 190 can be configured to print this information as soon as it engages in a discovery process with an unassociated client device as described above, the information will be readily and conveniently made available to the holder of an unassociated client device as they approach the POS printer.

Figure 8:
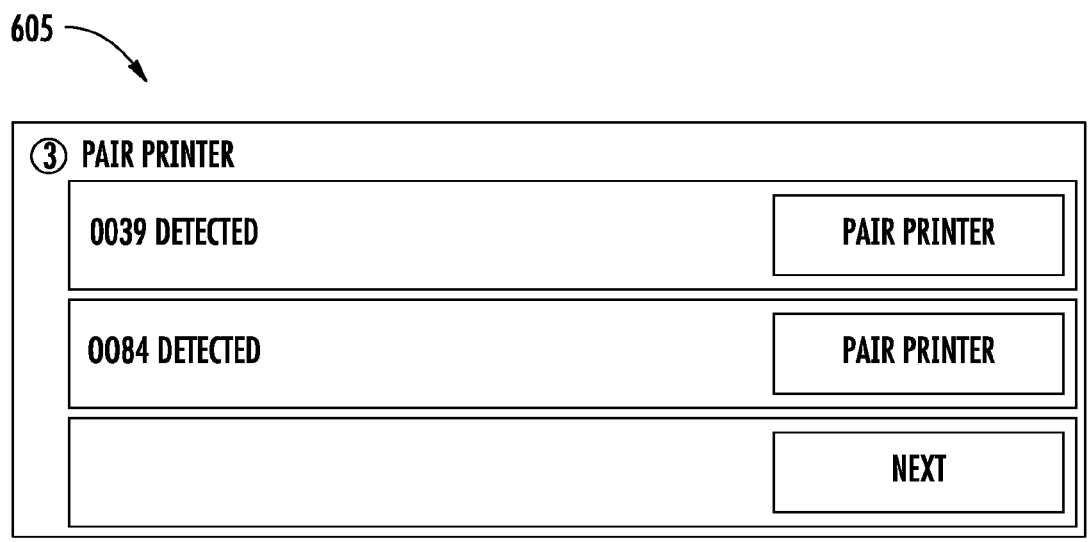

User interface 603 may present a user with detected POS printers 190, and may present an option to pair with or otherwise establish a connection with one or more available printing devices. Referring briefly to FIG. 8, in some instances the client device may detect more than one printing device, and may present a user interface 605 with selectable options allowing the user to select one or more printing devices to establish a connection with. The client device may further present device identification information of one or more printing devices within communication range. The device identification information can take on any of the forms described above with respect to the device identifier 604. A user may select one or more of the presented printing devices on the client device. The client device may be configured to establish a connection or be paired with a single or multiple printing devices, such that the client device can initiate printing at the printing device nearest the client device. In some embodiments, more than one client device may establish a connection or be paired with a single printing device, such that the single printing device serves as a shared printer. In other embodiments, multiple client devices may establish connections or be paired with multiple printers, such that an active client device can initiate printing at the nearest one of multiple possible printing devices.

Figure 9:
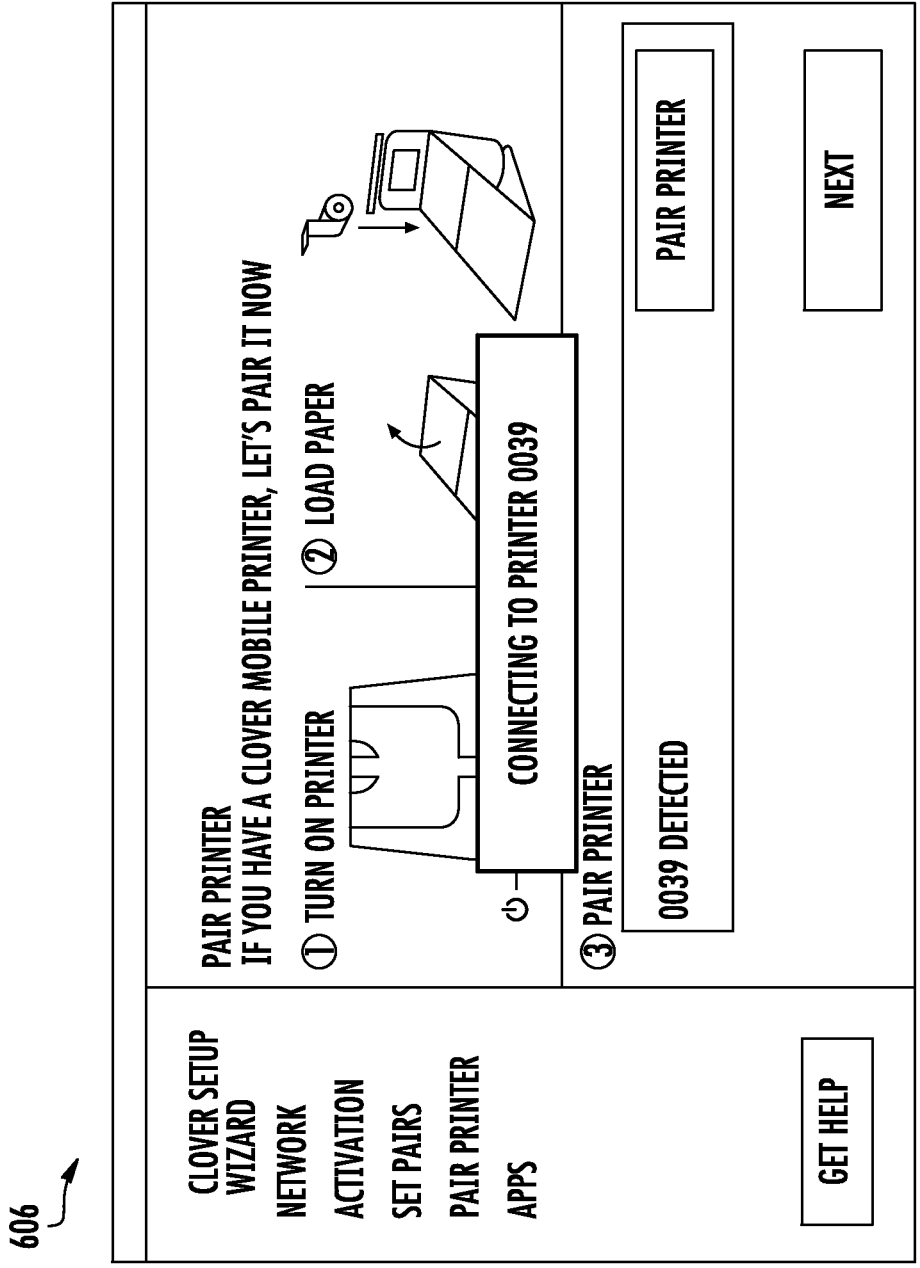

Upon receiving user input and/or a selection of a printing device to pair with, the client device may transmit a request to associate with the selected printing device. Upon transmitting the request to establish a connection, the client device may present a user interface 606 indicating an attempted connection, as shown in FIG. 9. In some embodiments, communication may be established between the client device and the printing device using any device pairing protocol where there is shared secret commonly derived between two devices (for example, a Diffie Hellman key agreement protocol) where the shared secret (or a derived hash thereof) must be confirmed by the operator between the two devices to ensure there is not a man-in-the-middle. Such a procedure can be used to establish a standard Bluetooth communication link between the printing device and the client device. In some embodiments, other forms of communication may be established between the client device and the printing device such as WiFi in accordance with established standards and protocols, such as the IEEE 802.11 family of standards, including via 2.4 GHz channels (e.g. 802.11b, 802.11g, 802.11n), 5 GHz channels (e.g. 802.11n, 802.11 ac), or 60 GHZ channels (e.g. 802.11ad). Other suitable forms of communication between the client device and the printing device include WiFi Direct, or wireless communication over cellular network infrastructure, such as Global System for Mobile Communications (GSM), including 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like.

At block 508 of FIG. 5, the printing device may receive a request to associate with a client device. For example, the POS printer 190 may receive a request to pair with the client device 120. At block 510, the printing device may automatically print client device association information upon receiving the request to pair with the client device. For example, the POS printer 190 may print a numerical sequence, a scannable barcode, such as a Quick Response Code, or other information configured to associate or otherwise establish a connection between the printing device and the client device. The client device association information can be derived from a shared secret that is generated on both the printing device and the client device using any device pairing protocol where such a shared secret is so derived between the two devices. For instance, the client device association information can be a string of human readable characters that are equivalent to the shared secret or represent a hash thereof.

Figure 10:
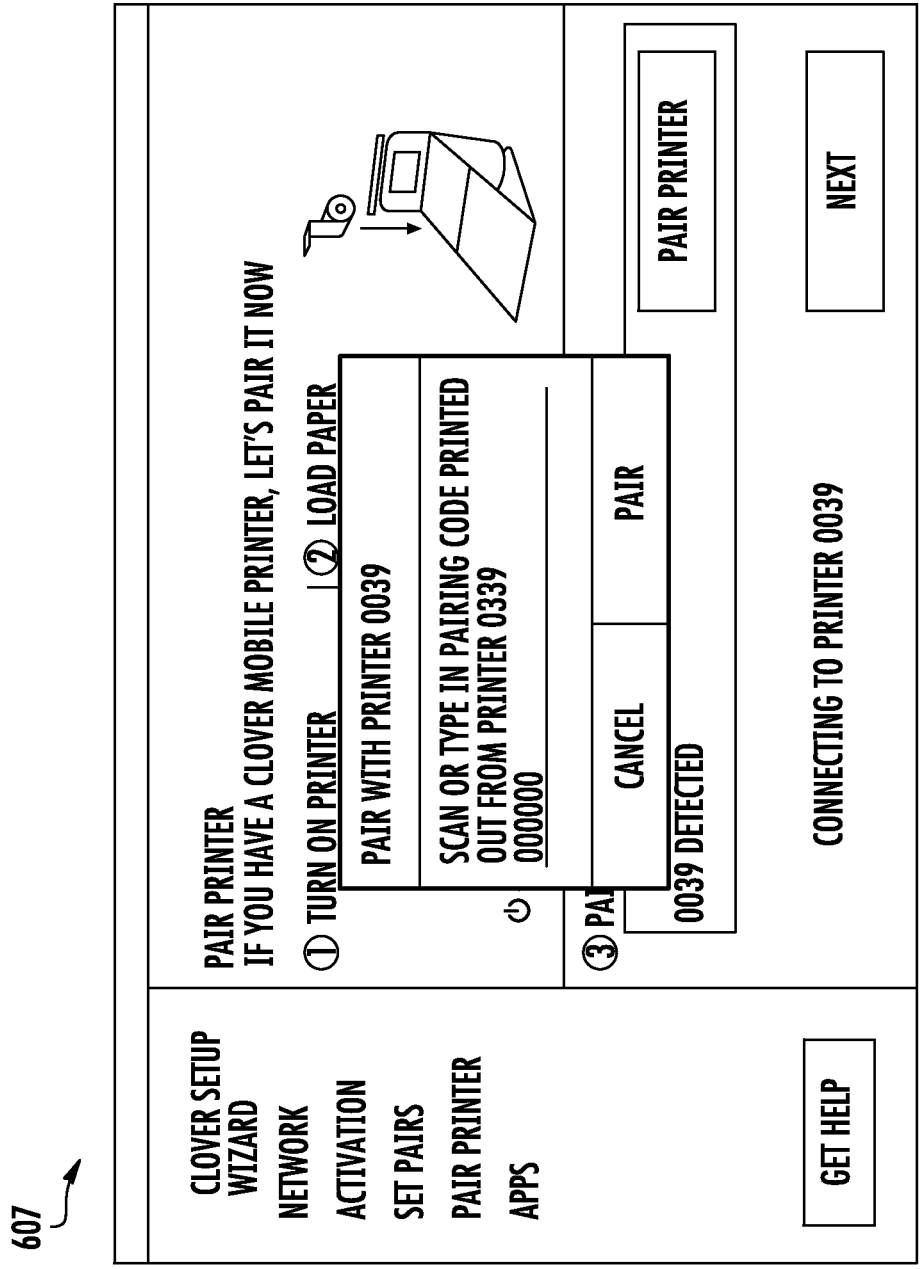
Figure 17:
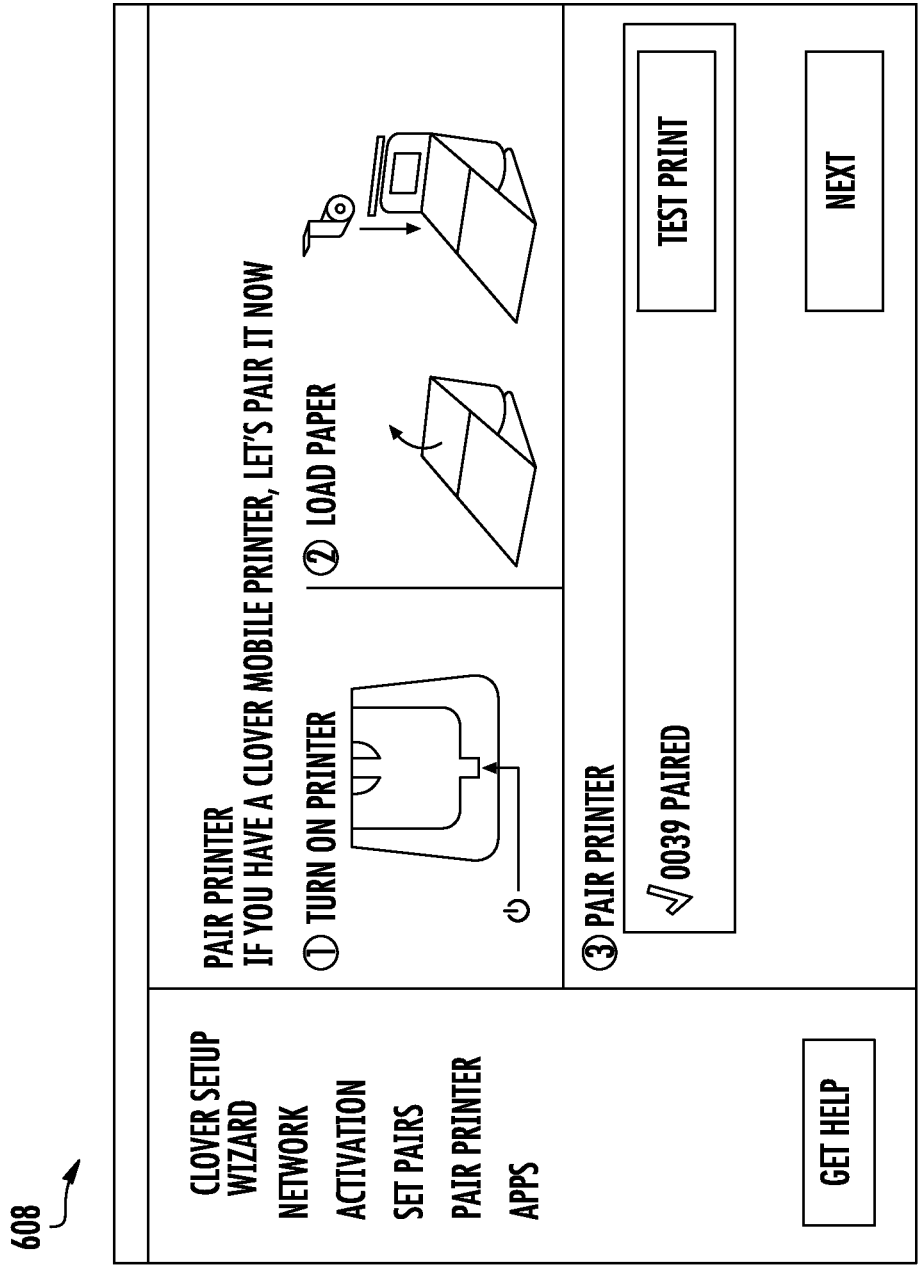

Referring to FIG. 10, the client device may present a user interface 607 prompting the user to input client device association information for the printing device for which a connection is to be established with. The user may enter the client device association information at the client device, for example at the user interface 607 of FIG. 10, or in some embodiments, may scan or otherwise capture an image of the client device association information printed by the printing device. The scan can be conducted by a scanner on the client device when the client device includes a scanner such as that described with reference to FIG. 3.

Certain benefits accrue to this approach in that an alternative channel is provided via a printer and that is already configured to output information to a user in the ordinary course of its use, and a scanner that saves the user from having to enter the client device association information. Furthermore, some client devices used as POS terminals will already have scanners to obtain data from bar codes on merchandise or from payment tokens like coupons with QR codes. As such, the pairing procedure utilizes two-way communication but does not require any additional hardware. Notably, any input device used during the ordinary course of operation of the client device can be re-appropriated temporarily to conduct this portion of the pairing procedure. For example, a POS terminal with a camera used to conduct OCR processing of a drivers license can take a picture of a human readable string of characters on a printout to receive the client association information. As another example, the printer may be able to broadcast the client association information via NFC communication, and the client device may utilize a built in NFC receiver used to process NFC payments to obtain the client association information. In general, since POS terminals take in payment data from a user, and embodiments of the pairing procedure likewise requires the client device to take in client association information, the input device can advantageously be any input device that is also used to accept payment information from the user.

Upon receiving the client device association data, the client device may automatically pair with the printing device without further input from the user. At block 512, the printing device associates with the client device based at least in part on the client device association information. For example, the POS printer 190 may be paired with the client device 120 when the client device receives the client device association information. Upon association of the printing device with the client device, the printing device may automatically print a test page or sample page to confirm association with the client device. If the client device association information entered on user interface 607 (or received by the client device via some other input device) matches the information expected by the client device in accordance with the pairing protocol, the client device may present a user interface such as 608 in FIG. 11 indicating that a connection has been established with the printing device and prompting the user to initiate a test print at the printing device. If the client device association information entered on user interface 607 does not match the information expected by the client device in accordance with the pairing protocol, the client device can refuse to complete the pairing operation and can display a user interface requesting the client device information to be entered again.

Mounting a Communication Antenna Beneath POS Displays

Figure 12:
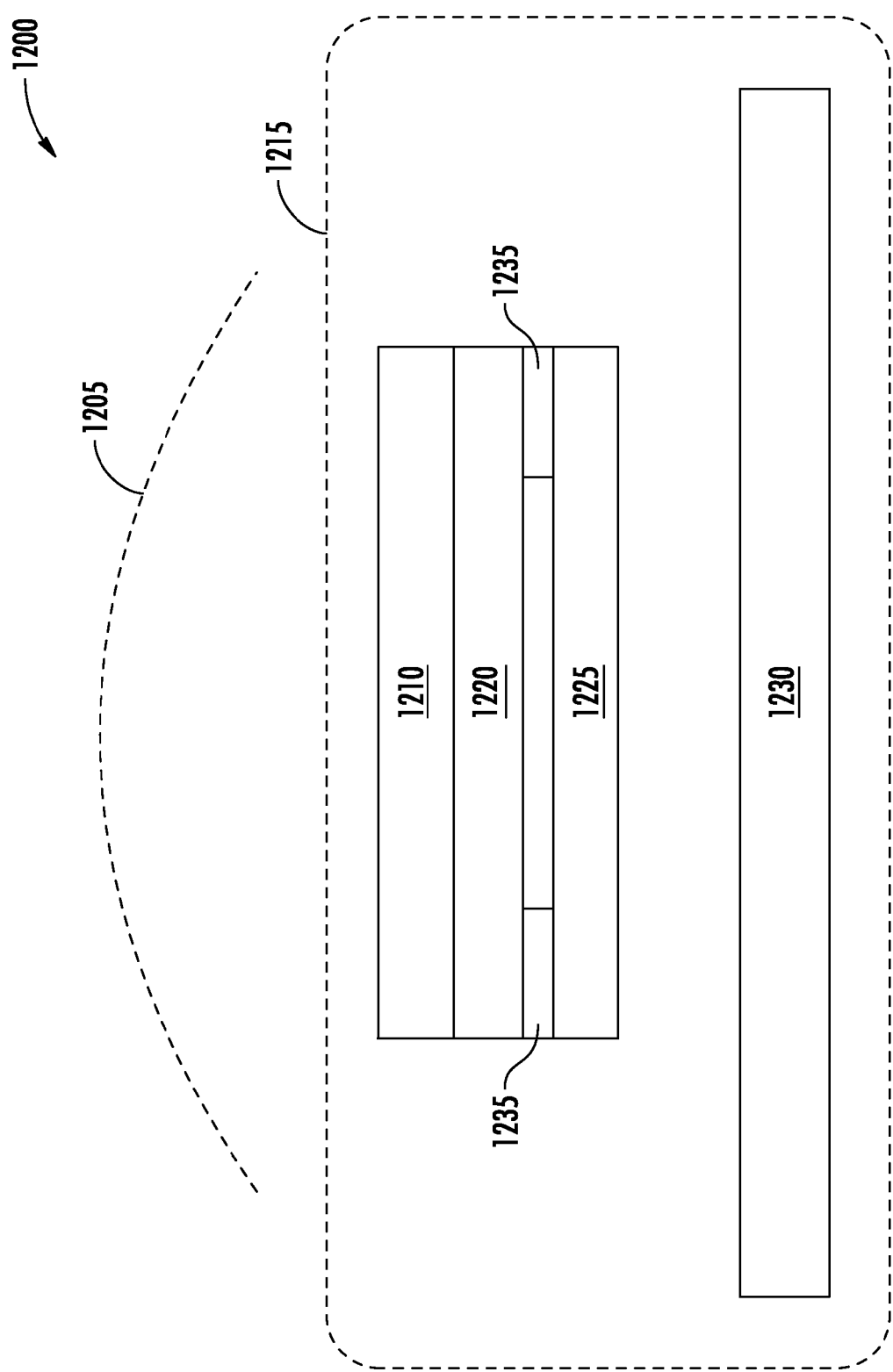
FIG. 12 depicts a cross-sectional view of an example internal configuration of a point point-of-sale (POS) device and internal short-range communication antenna configuration in accordance with one or more embodiments.

FIG. 12 depicts a cross-sectional view of an example internal configuration of a point of sale (POS) device 1200 in accordance with one or more embodiments of the disclosure. The POS device 1200 shown in FIG. 12 is operable to generate a predefined radio frequency (RF) field 1205 above or otherwise adjacent to the POS device 1200, for instance, above or adjacent to an associated touchscreen 1210 of the POS device 1200. In some embodiments, the predefined RF field 1205 may be generated from behind or opposing side of the flat panel display 1220 and the touchscreen 1210 but may be operable from above the flat panel display 1220 and the touchscreen 1210. In this manner, a user desiring to use a payment device with wireless payment communication capabilities, such as a smartphone enabled with a NFC (near field communication) chip, in a purchase transaction may, when prompted, wave the payment device above or otherwise in close proximity to the touchscreen 1210 of the POS device 1200 to facilitate wireless communications between the payment device and POS device 1200. The POS device 1200 may include the client device 120 shown in FIGS. 1-3.

As depicted in FIG. 12, the POS device 1200 may include a housing 1215 enclosing internal components of the POS device 1200. The internal components of the POS device 1200 may include, but are not limited to a touchscreen 1210, flat panel display 1220, short-range wireless communication antenna 1225, and a support frame 1230. Other components that may be included within the POS device are structural supports, processors, memory, data storage, input/output (I/O) interface, network interface, power adapter, adhesive 1235 (described more fully in FIG. 13), etc.

In some embodiments, the touchscreen 1210 may be an electronic visual display that a user can control through simple or multi-touch gestures by touching an outer layer of the touchscreen 1200 with an instrument (e.g., stylus, pen, glove, etc.) or one or more fingers. Touchscreen technologies may include, but are not limited to resistive touch technology, surface acoustic wave technology, capacitive sensing, surface capacitance technology, projected capacitance technology, mutual capacitance technology, self-capacitance technology, infrared technology, infrared acrylic projection technology, optical imaging technology, dispersive signal technology, acoustic pulse recognition technology, etc.

In the embodiment shown in FIG. 12, the flat panel display 1220 may be positioned behind or underneath the touchscreen 1210 within the POS device 1200, wherein the touchscreen 1210 is mounted to a first outer surface of the flat panel display 1220. In some embodiments, the flat display 1220 may be a four inch (diagonal) or larger display.

The flat panel display 1220 may be categorized as volatile or static. A volatile display may require that pixels be periodically refreshed to retain their state, which may occur many times a second. Examples of a volatile flat panel display may include, but are not limited to, active-matrix liquid-crystal display (AMLCD), electronic paper, electroluminescent display (ELD), digital light processing display (DLP), organic light-emitting diode display (OLED), light-emitting diode display (LED), liquid-crystal display (LCD), plasma display panel (PDP), etc. A static flat panel display may rely on materials whose color states are bi-stable, where the image they hold requires no energy to maintain, but requires energy to change. Examples of a static display can include cholesteric displays, electrophoretic displays, etc.

In the embodiment shown in FIG. 12, the short-range wireless communication antenna 1225 associated with a short-range wireless communication device (described in more detail in FIG. 13) may be positioned behind or underneath the flat panel display 1220 within the POS device 1200, wherein the antenna 1225 is mounted to an opposing or other outer surface of the flat panel display 1220. That is, the flat panel display 1220 is sandwiched between the touchscreen 1210 and the antenna 1225. A relatively thin layer of adhesive 1235 may be used to mount the antenna 1225 directly to the opposing surface of the flat panel display 1220. In some embodiments, the thin layer of adhesive 1235 may be used to mount the antenna 1225 directly to the support frame 1230. In any instance, the antenna 1225 may be electrically coupled to an associated wireless communication reader 1310 and optional amplifier 1315, which are shown in FIG. 13.

One example of short-range wireless communication is near-field communication (NFC). Many handheld user devices, such as smartphones, tablets, smart watches, and the like, may use short-range wireless communication technology to facilitate transactions. The short-range wireless communication antenna 1225 is described with more detail with regards to FIG. 13. As depicted, the short-range wireless communication antenna 1225 may be positioned to provide a predefined radio frequency (RF) field 1205, which may be generated from behind or opposing side of the flat panel display 1220 and the touchscreen 1210, but operable from above the flat panel display 1220 and the touchscreen 1210. In some embodiments, the RF field 1205, is generally operable adjacent to and above the touchscreen 1210 of the POS device 1200. For example, a predefined radio frequency (RF) field 1205 can be generated from the POS device 1200 to permit certain short-range wireless communication-enabled user devices, such as smartphones, tablets, smart watches, and the like, to detect or otherwise communicate via the RF field 1205 and facilitate a purchase transaction with the POS device 1200. In some embodiments, the predefined RF field range may extend up to approximately four centimeters from a particular location, such as the center portion, of the touchscreen 1210.

In some embodiments, the support frame 1230 may be positioned underneath the short-range wireless communication antenna 1225. In some embodiments, the support frame 1230 may be called the midframe, and may provide certain rigidity to the POS device 1200 and/or the associated housing 1215 of the POS device 1200. In any instance, the support frame 1230 may be positioned in an internally central position of the POS device 1200 to provide support for other internal components of the POS device 1200. In some embodiments, the support frame 1230 may be constructed out of metal, plastic, acrylic, or other material strong enough to support the weight and internal layout or design of the internal components of the POS device 1200.

Figure 13:
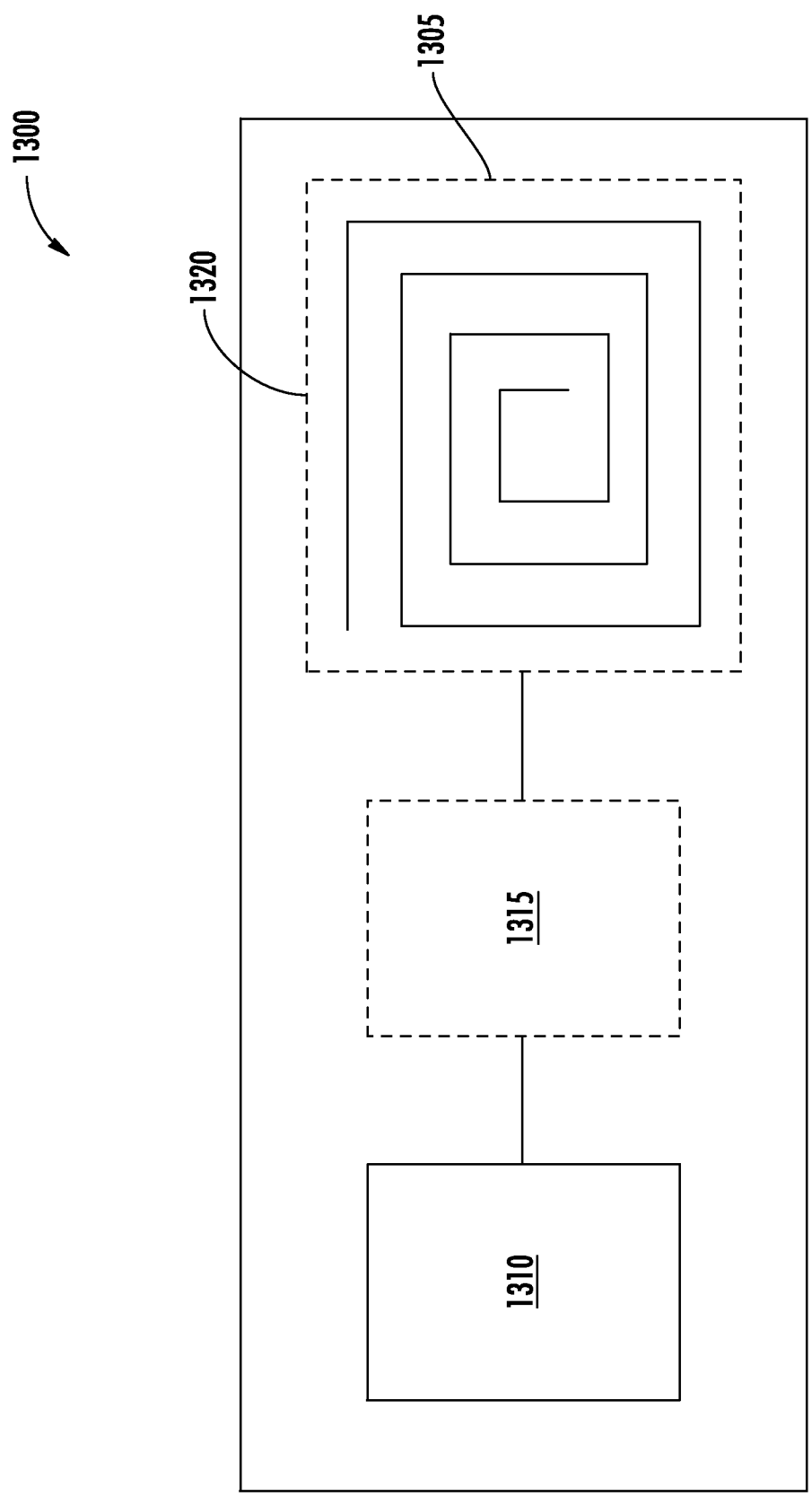
FIG. 13 illustrates an overhead view of an example configuration of an internal short-range communication device for a point-of-sale (POS) device in accordance with one or more embodiments.

Turning to FIG. 13, an overhead view of example configuration of a short-range wireless communication device 1300 is shown that includes a short-range wireless antenna 1305, similar to 1225 in FIG. 12, with an associated wireless communication reader 1310 and optional amplifier 1315 in accordance with one or more embodiments of the disclosure. As depicted, these components may be collectively known as a short-range wireless communication device 1300, and may include a reader 1310, an optional amplifier 1315, and an antenna 1305.

In some embodiments, the short-range wireless communication device 1300 may operate using relatively low frequencies (e.g., 13.56 MHz). Such low frequencies may be utilized for exchanging information related to financial transactions as the low frequency range makes it difficult for third parties to eavesdrop on associated communications and/or messages. In some embodiments, the short-range wireless communication device 1300 may be a NFC device. The reader 1310 may drive the amplifier 1315 and the antenna 1305 to generate the RF field, similar to RF field 1205 in FIG. 12, that in turn bridges the physical space between the POS device 1200 and short-range wireless communication-enabled devices. In some embodiments, the reader 1310 may drive the optional amplifier 1315 and antenna 1305 to generate an electromagnetic field 1205 transmitted above the touchscreen 1210. The short-range wireless communication enabled device may be positioned above the touchscreen 1210 of the POS device 1200, receive and convert the RF energy into power and uses the same energy and electromagnetic field signal to transport data back to the reader 1310 through antenna 1305. A communication link may be established and completed between the reader 1310 and the short rant wireless communication-enabled device. The reader 1310 may communicate the received data to other components of the POS device 1200 to facilitate a transaction between the short range wireless communications-enabled device and the POS device 1200.

In some embodiments, the short-range wireless communication device 1300 may include the reader 1310 and the antenna 1305 and may not include the optional amplifier 1315, where the reader 1310 may drive the antenna 1305 to generate the RF field 1205, receive signals from the short-range wireless communication-enabled devices, and transmit the received data to the other components of the POS device 1200 to facilitate transactions between the POS device 1200 and the short range wireless communication-enabled devices.

As seen in FIG. 13, the antenna 1305 is shown with respect to a flat panel display 1320, similar to 1220 shown in FIG. 12. As described with respect to FIG. 13, the antenna 1305 can be mounted to a flat panel display, such as 1320, wherein the antenna 1305 is mounted to an opposing or other outer surface of the flat panel display 1320. In some embodiments, the antenna 1305 may be mounted to a support, such as 1230 in FIG. 12, wherein the antenna 1305 is mounted to a surface of the support frame facing towards the flat panel display 1320.

Example Methods of Mounting an Antenna Beneath a POS Display

Figure 14:
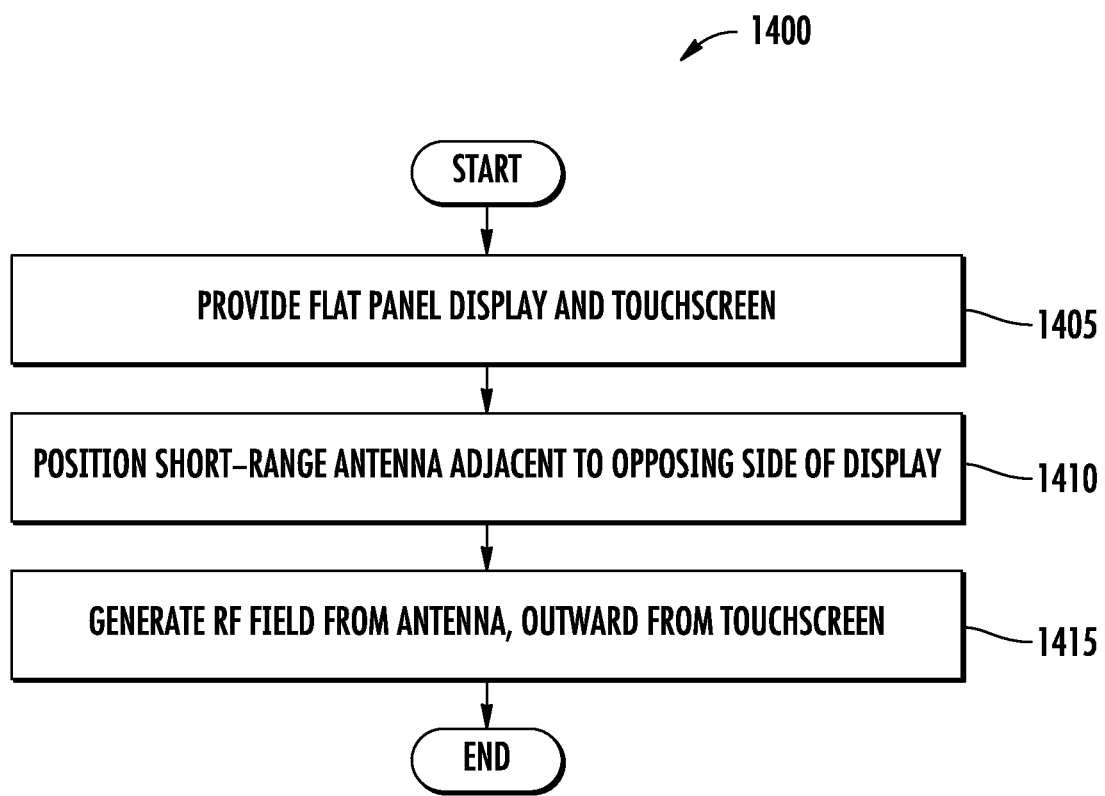
FIG. 14 illustrates example methods of mounting a wireless communication antenna in a point-of-sale (POS) device in accordance with one or more embodiments.

FIG. 14 is a flow diagram depicting an illustrative method 1400 for mounting an antenna, such as 1225 in FIG. 12, beneath a flat panel display, such as 1220 in FIG. 12, associated with a POS device, such as 1200 in FIG. 12, in accordance with one or more embodiments of the disclosure.

At block 1405 of method 1400, a touchscreen 1210 and flat panel display 1220 of a POS device, such as 1200, may be provided, wherein the touchscreen 1210 can include a first outer surface and an opposing outer surface, and the opposing outer surface is positioned adjacent to one side of the flat panel display 1220. In some embodiments, the touchscreen 1210 may utilize one of many different touchscreen technologies that have different methods of sensing touch, as described herein. The flat panel display 1220 may be of any type of flat panel display, such as those described herein. The flat panel display 1220 may be positioned behind the touchscreen 1210, where the front of the touchscreen 1210 is oriented to face outward or away from the POS device 1200 and visible by the user. In some embodiments, the flat panel display 1220 may be positioned along the side of the touchscreen 1210 not facing the user. In some embodiments, the flat panel display 1220 may be positioned along the backside of the touchscreen 1210 using positioning mechanisms, such as adhesives, clamps, screws, mounts, rails, or the like.

At block 1410, a short-range wireless communication antenna 1225 may be positioned adjacent to an opposing side of the flat panel display 1220. That is, the flat panel display 1220 may be sandwiched between the touchscreen 1210 and the short-range wireless communication antenna 1225. In some embodiments, a relatively thin layer of adhesive 1235 can be used to mount the short-range wireless communication antenna 1225 to the opposing side of the flat panel display 1220. The short-range wireless communication antenna 1225 may be any kind of antenna suitable for a short-range wireless communication device, such as those described herein. In some embodiments, the short-range wireless communication antenna 1225 may be positioned along the backside of the flat panel display 1220 using any number of positioning mechanisms, such as adhesives, clamps, screws, mounts, rails, or the like. In some embodiments, any technique and/or device to mount the short-range wireless communication antenna 1225 to a portion of the opposing side of the flat panel display 1220 can be used as long as any mura effects on the flat panel display 1220 are minimized or otherwise eliminated.

At block 1415, a RF field 1205 can be generated from the short-range wireless communication antenna 1225, wherein the RF field 1205 extends outward from the first outer surface of the touchscreen 1210. When the short-range wireless communication antenna 1225 is electrically connected to an associated wireless communication reader 1310 and amplifier 1315, all of these components may collectively be known as a short-range wireless communication device, similar to 1300 shown in FIG. 13. In some embodiments, the short-range wireless communication device 1300 may be an NFC device. In any instance, the reader 1310 may drive the optional amplifier 1315 and antenna 1225 to generate an electromagnetic field 1205 transmitted above the touchscreen 1210. The short-range wireless communication enabled device may be positioned above the touchscreen 1210 of the POS device 1200, receive and convert the RF energy into power and uses the same energy and electromagnetic field signal to transport data back to the reader 1310 through antenna 1225. A communication link may be established and completed between the reader 1310 and the short range wireless communication-enabled device. The reader 1310 may communicate the received data to other components of the POS device 1200 to facilitate a transaction between the short range wireless communications-enabled device and the POS device 1200.

In one embodiment, a support frame, such as 1230, may be positioned behind the flat panel display 1220 and the short-range wireless communication antenna 1225. The support frame 1230 may be positioned adjacent to the opposing side of the flat panel display 1220 using any number of positioning mechanisms, such as relatively thin adhesives, clamps, screws, mounts, rails, or the like. In some embodiments, the support frame 1230 may be positioned to provide a relatively small air gap between the short-range wireless communications antenna 1225 and the support frame 1230.

In one embodiment, the short-range wireless communication antenna 1225 can be mounted to a portion of the support frame 1230, wherein the antenna 1225 is adjacent and in close proximity to the opposing side of the flat panel display 1220. In such an embodiment, a relatively small air gap may exist between the flat panel display 1220 and the antenna 1225. The antenna 1225 may be mounted to the support frame 1230 using any number of positioning mechanisms, such as relatively thin adhesives, clamps, screws, mounts, rails, or the like.

Example Embodiments of Mounted Antenna Beneath a POS Display

Figure 15:
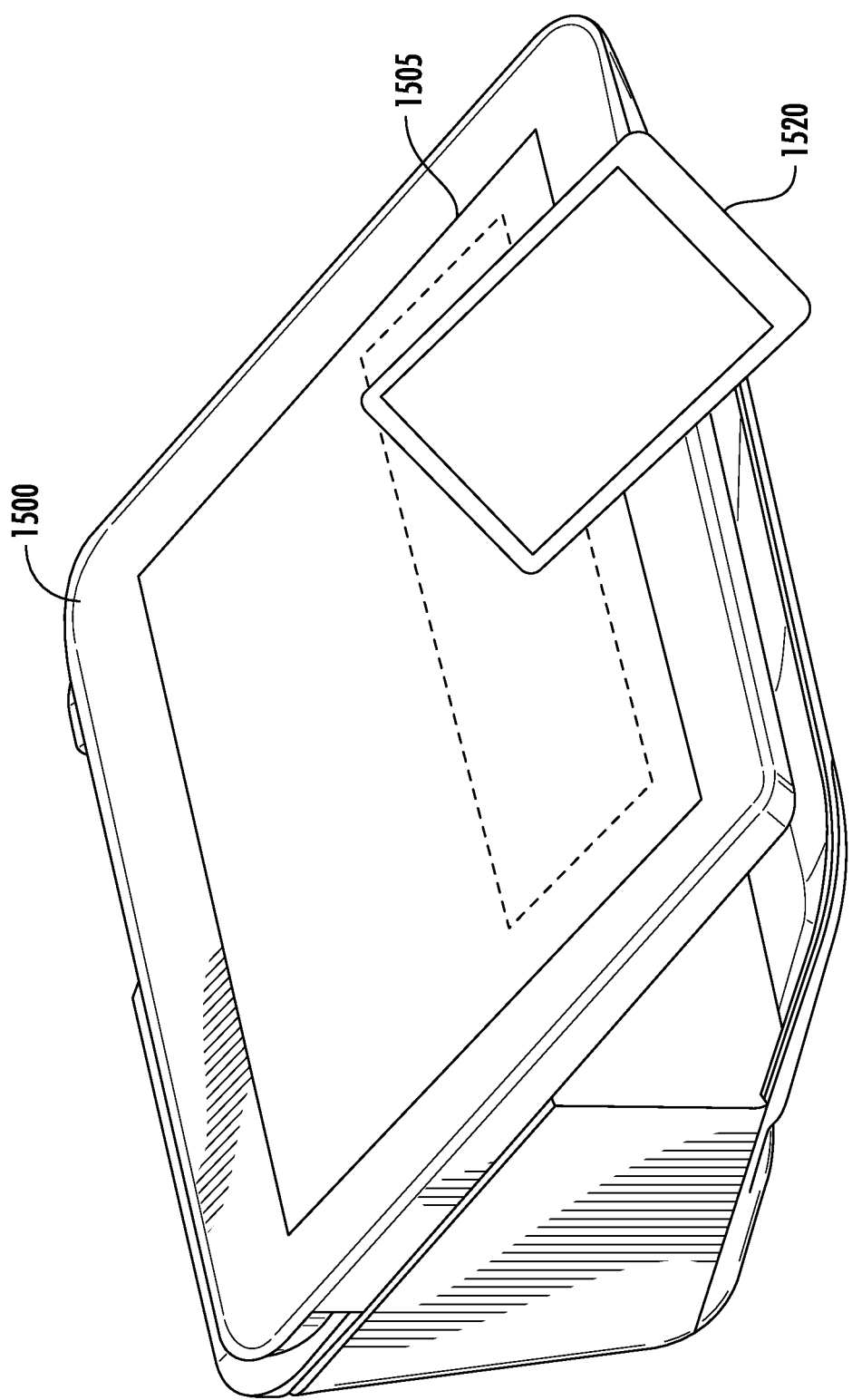
FIGS. 15-16 illustrate different radio frequency fields generated by various point-of-sale (POS) devices in accordance with one or more embodiments.

FIG. 15 is an example embodiment of an approximate RF field 1205 generated by an antenna, such as 1225 in FIG. 12, mounted internally in a POS device 1500, similar to 1200 in FIG. 12. For example, in FIG. 15 and with reference to FIG. 12, the antenna 1225 may be mounted beneath touchscreen 1210 and the flat panel display 1220, where the RF field 1205 is generated within the width and length of the touchscreen 1210 and flat panel display 1220 visible to the user. A user can orient his or her short-range wireless communication enabled device 1520 within the generated RF field 1505. In some embodiments, the flat panel display 1220 may generate a visual cue to indicate to the user where to orient his or her short-range wireless communication enabled device 1520 in relation to the RF field 1505 generated by the antenna 1225.

Figure 16:
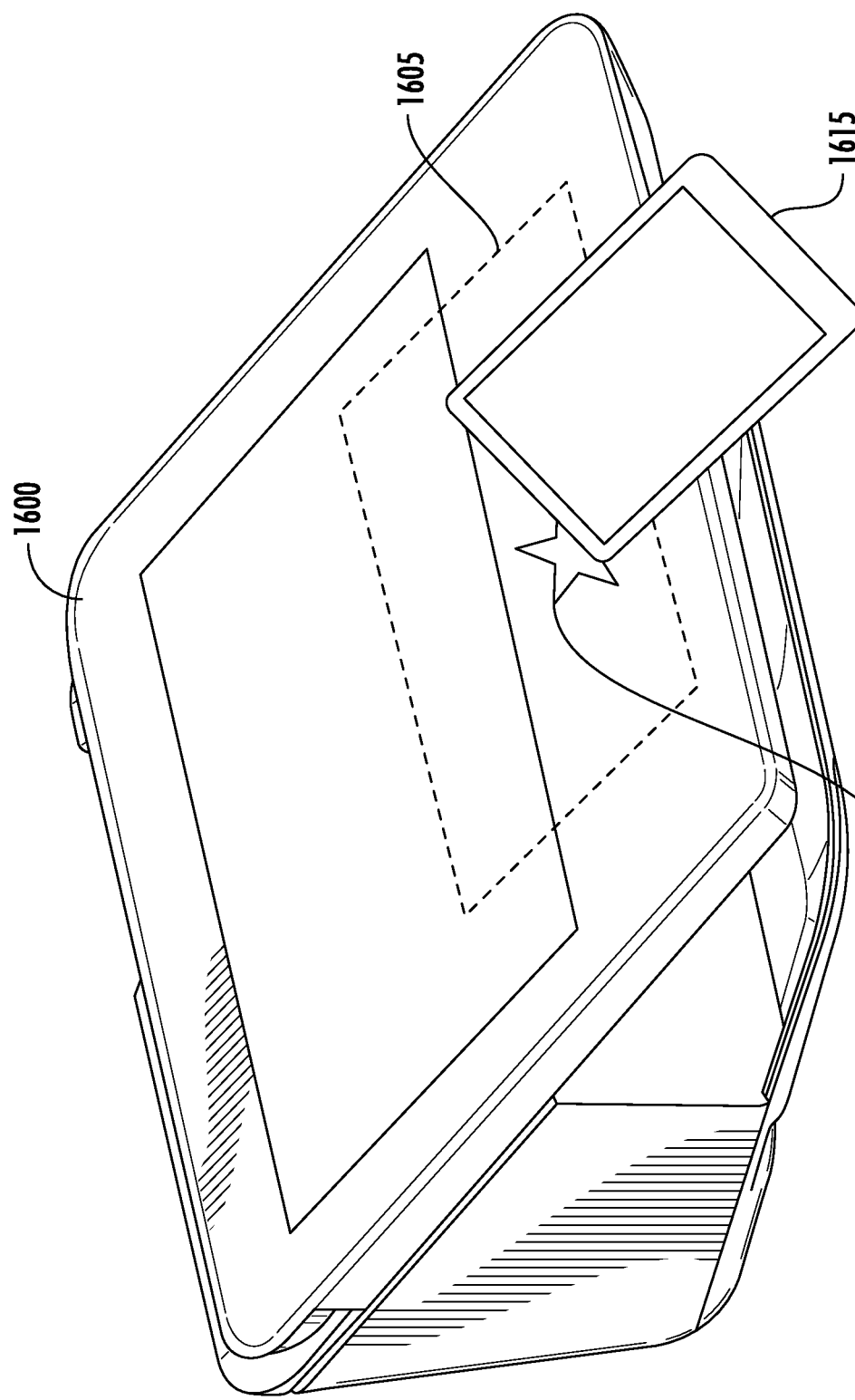

FIG. 16 is an example embodiment of an approximate RF field 1605, different than the RF field 1505 in FIG. 15, generated by an antenna 1225 mounted internally in a POS device 1600, similar to 1200 in FIG. 12. For example, in FIG. 16 and with reference to FIG. 12, the antenna 1225 may be oriented in such a way that a portion of the RF field 1605 is generated within the width and/or length of the touchscreen 1210 and flat panel display 1220 visible to the user and a portion of the RF field 1605 is generated within the bounds of another portion of the POS device 1600, such as within the length and/or width of the housing of the display portion of the POS device 1600, as depicted in FIG. 16. In some embodiments, the RF field 1605 may be visually depicted to the user through a visual means, such as a message generated by the flat panel display 1220 or a marking on a portion of the POS device 1600, such as a logo 1610 or other type of visual indication to guide the user to orient their short-range wireless communication enabled device 1615 in relation to the RF field 1605 generated by the antenna 1225.

Multiple Applications on a POS Device

In some embodiments, multiple applications may be executed on the POS devices. The applications may be in communication with each other to share credentials and information. For example, one application that may execute on a POS device is a register application. A second application that may execute on the POS device may be an inventory application. Once a user signs into the register application, the register application and inventory application may communicate with each other to pass authentication credentials so the user only has to sign into the system once. The register application may communicate with the inventory application to obtain information regarding the status of certain items in inventory. The different applications may be provided by the system or may be developed by third parties. In some embodiments, applications may have the ability to automatically discover each other and authenticate and interact with each other.

In example embodiments of the disclosure, there may be a computer-implemented method. The method may include determining, by a POS device including one or more processors, the location of a print server within a distance. The method may include generating, by the POS device, a wake-up message associated with the print server using a communication protocol. The method may include establishing, by the POS device, a communication session with the print server. The method may include generating, by the POS device, a print job associated with the print server. Determining the location of a print server may include determining the closest printer associated with the print server. A wake-up message may power on a printer associated with the print server. The communication protocol may be a BLE protocol. Establishing a communication session may include establishing a payment session. The payment session may include digital wallets. The method may further include powering off a printer associated with the print server when the print job is completed.

According to example embodiments of the disclosure, there may be a POS device. The POS device may include at least one memory storing computer-executable instructions and at least one processor, wherein the at least one processor may be configured to access the at least one memory and to execute computer-executable instructions. The at least one processor may be configured, in response to execution of the instructions, to determine, by a POS device including one or more processors, the location of a print server within a distance. The at least one processor may be configured, in response to execution of the instructions, to generate, by the POS device, a wake-up message associated with the print server using a communication protocol. The at least one processor may be configured, in response to execution of the instructions, to establish, by the POS device, a communication session with the print server. The at least one processor may be configured, in response to execution of the instructions, to generate, by the POS device, a print job associated with the print server. Determining the location of a print server may include determining the closest printer associated with the print server. A wake-up message may power on a printer associated with the print server. The communication protocol may be a BLE protocol. Establishing a communication session may include establishing a payment session. The payment session may include digital wallets. The at least one processor may be further configured, in response to execution of the instructions, to power off a printer associated with the print server when the print job is completed.

In example embodiments of the disclosure, there may be a computer-readable medium storing computer-executable instructions which, when executed by a processor, cause the processor to perform operations. The operations may include determining, by a POS device including one or more processors, the location of a print server within a distance. The operations may include generate, by the POS device, a wake-up message associated with the print server using a communication protocol. The operations may include establishing, by the POS device, a communication session with the print server. The operations may include generating, by the POS device, a print job associated with the print server. Determining the location of a print server may include determining the closest printer associated with the print server. A wake-up message may power on a printer associated with the print server. The communication protocol may be a BLE protocol. Establishing a communication session may include establishing a payment session. The payment session may include digital wallets. The operations may further include powering off a printer associated with the print server when the print job is completed.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

CONCLUSION

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although a majority of the application was directed specifically to pairing a POS printing device with a client device, the methods devices and systems disclosed above can be utilized to facilitate the association of any peripheral with a client device including networking devices (e.g., routers) to connect the client device to a network. As another example, any of the communications between the client device and the printing device described above may be conducted directly or be routed through a print server, one or more networks, or the like. These and other modifications and variations to the present invention may be practiced by those skilled in the art, without departing from the scope of the present invention, which is more particularly set forth in the appended claims.

What is claimed is:

1. A computer-implemented method for pairing a point of sale printer with a client device, using two-way identification, comprising:
   receiving, using the point of sale printer and a wireless communication protocol, a request to pair the point of sale printer;
   deriving, using the point of sale printer, the client device, and a device pairing protocol, a shared secret at the client device and the point of sale printer;
   printing, using the point of sale printer and upon deriving the shared secret, client device association information on a printout;
   receiving, using the client device and the printout, the client device association information; and associating the point of sale printer and the client device using the client device association information as received using the client device.

2. The computer-implemented method of claim 1, further comprising:
    determining, using the point of sale printer, that the point of sale printer is unassociated; and
    automatically printing, using the point of sale printer and upon determining that the point of sale printer is unassociated, a print device identifier;
    wherein the print device identifier identifies the point of sale printer.

3. The computer-implemented method of claim 2, further comprising:
    presenting, using a user interface on the client device, a list of detected point of sale printers, wherein the point of sale printer is in the list of detected point of sale printers and is identified in the list of detected point of sale printers using the print device identifier; and
    sending, using the client device and upon selection of the point of sale printer from the list of detected point of sale printers, the request to pair the point of sale printer.

4. The computer-implemented method of claim 2, further comprising:
    determining, using the client device, that the point of sale printer is within a distance of the client device; and
    generating, upon determining that the point of sale printer is within the distance of the client device, a wake-up message associated with the point of sale printer using the client device.

5. The computer-implemented method of claim 4, wherein:
    the determining that the point of sale printer is unassociated step is conducted in response to the wake-up message.

6. The computer-implemented method of claim 4, wherein:
    the determining that the point of sale printer is unassociated step is conducted automatically when the point of sale printer is powered on.

7. The computer-implemented method of claim 6, further comprising:
    displaying, using a user interface on the client device and prior to the determining that the point of sale printer is unassociated step, instructions to power on the point of sale printer and load paper into the point of sale printer.

8. The computer-implemented method of claim 1, wherein:
    the client device association information on the printout is in the form of a scannable barcode;
    the client device association information is the shared secret or a hash of the shared secret; and
    the client device association information is received using the client device by scanning the scannable barcode.

9. The computer-implemented method of claim 1, wherein:
    the client device association information on the printout is in the form of a string of human readable characters;
    the client device association information is the shared secret or a hash of the shared secret; and
    the client device association information is received using a user interface on the client device.

10. The computer-implemented method of claim 1, wherein:
    the request to pair the point of sale printer is received in accordance with a short range communications protocol; and
    the shared secret is derived using a Diffie Hellman key agreement protocol.

11. A computer-implemented method for pairing a printing device with a client device, using two-way identification, comprising:
    sending, from the client device, a request to pair the printing device;
    receiving, using the printing device and a wireless communication protocol, the request to pair the printing device;
    generating on both the printing device and the client device, a shared secret in accordance with a device pairing protocol, wherein the shared secret is derived between the two devices;
    printing, using the printing device, client device association information on a printout, wherein the client device association information is based on the shared secret;
    receiving, using the client device and the printout, the client device association information; and
    automatically pairing the client device with the printing device upon receiving the client device association information from the printout with the client device.

12. The computer-implemented method of claim 11, further comprising:
    determining, using the printing device, that the printing device is unassociated; and
    automatically printing, using the printing device and upon determining that the printing device is unassociated, a print device identifier;
    wherein the print device identifier identifies the printing device.

13. The computer-implemented method of claim 12, further comprising:
    determining, using the client device, that the printing device is within a distance of the client device; and
    generating, upon determining that the printing device is within the distance of the client device, a wake-up message associated with the printing device using the client device;
    wherein the determining that the printing device is unassociated step is conducted in response to the wake-up message.

14. The computer-implemented method of claim 13, wherein:
    the wireless communication protocol is a short range communications protocol;
    the shared secret is derived using a Diffie Hellman key agreement protocol; and
    the printing device is a point of sale printer.

15. A system for pairing a printing device with a client device, using two-way identification, comprising:
    a memory on the client device, storing a set of non-transitory computer readable instructions to send a request to pair the printing device using a wireless communication protocol and subsequently derive a shared secret with the printing device;
    a printer, wherein the printing device is configured to instruct the printer to print client device association information upon the client device deriving the shared secret;
    a first printout, wherein the first printout is printed by the printer and includes the client device association information that is printed upon the client device deriving the shared secret; and
    an input device, provided on the client device, to receive the client device association information;

wherein the client device is also configured to associate the printing device with the client device using the client device association information received via the input device.

16. The system of claim 15 wherein:
the client device uses Bluetooth;
the shared secret is derived using a key agreement protocol; and
the printing device is a point of sale printer.

17. The system of claim 15, further comprising:
a second printout, wherein the second printout is printed by the printer and includes a print device identifier that identifies the printing device;
wherein the printing device instructs the printer to print the print device identifier upon determining that the printing device is unassociated.

18. The system of claim 17, wherein the set of instructions further comprises instructions to:
determine if the printing device is within a distance of the client device; and
generate, upon determining that the printing device is within the distance of the client device, a wake-up message associated with the printing device.

19. The system of claim 18, wherein:
the printing device is configured to determine if the printing device is unassociated in response to the wake-up message.

20. The system of claim 18, wherein:
the printing device is configured to determine if the printing device is unassociated automatically when the point of sale printer is powered on.

21. The system of claim 15, further comprising:
a user interface on the client device that displays instructions to power on the printing device and load paper into the printer.

22. The system of claim 15, further comprising:
a scanner on the client device that serves as the input device to receive the client device association information;
wherein the client device association information is the shared secret or a hash of the shared secret; and
wherein the client device association information is provided on the first printout in the form of a scannable barcode.

23. The system of claim 15, further comprising:
a user interface on the client device that serves as the input device to receive the client device association information;
wherein the client device association information is the shared secret or a hash of the shared secret; and
wherein the client device association information is provided on the first printout in the form of a string of human readable characters.

* * * * *